(12) United States Patent
Tsuno et al.

(10) Patent No.: US 8,215,780 B2
(45) Date of Patent: Jul. 10, 2012

(54) HARD-COATED ANTIGLARE FILM, AND POLARIZING PLATE AND IMAGE DISPLAY INCLUDING THE SAME

(75) Inventors: Naoki Tsuno, Ibaraki (JP); Daisuke Hamamoto, Ibaraki (JP); Hiroki Ozawa, Ibaraki (JP); Hiroki Kuramoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 448 days.

(21) Appl. No.: 12/413,978

(22) Filed: Mar. 30, 2009

(65) Prior Publication Data
US 2009/0244710 A1   Oct. 1, 2009

(30) Foreign Application Priority Data

Mar. 31, 2008   (JP) ................. 2008-092030
May 30, 2008   (JP) ................. 2008-142821

(51) Int. Cl.
   *G02B 27/00*   (2006.01)
(52) U.S. Cl. ...................... 359/601; 359/599
(58) Field of Classification Search ............. 359/599, 359/601, 577–590
   See application file for complete search history.

(56) References Cited

U.S. PATENT DOCUMENTS

| | | | | |
|---|---|---|---|---|
| 6,042,928 | A * | 3/2000 | Suzuki et al. | 428/141 |
| 6,639,725 | B2 * | 10/2003 | Masaki et al. | 359/599 |
| 6,913,365 | B2 | 7/2005 | Masaki et al. | |
| 2005/0255291 | A1 | 11/2005 | Iwata et al. | |
| 2007/0195431 | A1 | 8/2007 | Asakura et al. | |
| 2007/0253066 | A1 | 11/2007 | Takao et al. | |
| 2007/0291367 | A1 * | 12/2007 | Hamamoto et al. | 359/601 |
| 2008/0026182 | A1 * | 1/2008 | Abe et al. | 428/141 |
| 2009/0002831 | A1 * | 1/2009 | Mikami et al. | 359/599 |

FOREIGN PATENT DOCUMENTS

| | | |
|---|---|---|
| CN | 101063721 A | 10/2007 |
| JP | 2002-169007 A | 6/2002 |
| JP | 2002-207109 A | 7/2002 |
| JP | 2003-004903 A | 1/2003 |
| JP | 2005-316413 A | 11/2005 |
| JP | 2007249191 A | 9/2007 |
| JP | 2007-264113 A | 10/2007 |

OTHER PUBLICATIONS

Korean Office Action dated Dec. 24, 2010, issued in corresponding Korean Patent Application No. 10-2009-0026761. (w/partial English translation).

(Continued)

*Primary Examiner* — Thong Nguyen
(74) *Attorney, Agent, or Firm* — Westerman, Hattori, Daniels & Adrian, LLP

(57) ABSTRACT

A hard-coated antiglare film, comprising a transparent plastic film substrate and a hard-coating antiglare layer containing fine particles on at least one surface of the transparent plastic film substrate, wherein an arithmetic average surface roughness Ra (μm) that is defined in JIS B 0601 (1994 version) is in the range of 0.05 to 0.15 μm in an uneven shape of a surface of the hard-coating antiglare layer, and the hard-coated antiglare film includes at least 80 convexities that exceed a roughness mean line of a surface roughness profile in a 4-mm long portion at an arbitrary location of the surface of the hard-coating antiglare layer.

12 Claims, 11 Drawing Sheets

Hard-coating antiglare layer

Transparent plastic film substrate

OTHER PUBLICATIONS

Chinese Office Action dated Apr. 14, 2011, issued in corresponding Chinese Patent Application No. 200910129880.1 with a partial English translation.

Japanese Office Action dated Aug. 11, 2009, issued in corresponding Japanese Patent Application No. 2009-025501.

Japan Patent Office. Japanese Office Action dated Dec. 4, 2009. Japan Application No. 2009-025501. English Language Translation. 4 pages.

Chinese Office Action dated Sep. 15, 2011, issued in corresponding Chinese Patent Application No. 200910129880.1.

* cited by examiner

Hard-coating antiglare layer
Transparent plastic film substrate

Antireflection layer
Hard-coating antiglare layer
Transparent plastic film substrate Hard-coated antiglare film
Polarizer

HARD-COATED ANTIGLARE FILM, AND POLARIZING PLATE AND IMAGE DISPLAY INCLUDING THE SAME

CROSS-REFERENCE TO RELATED APPLICATIONS

This application claims priority from Japanese Patent Application Nos. 2008-092030 filed on Mar. 31, 2008 and 2008-142821 filed on May 30, 2008 the entire contents of which are hereby incorporated by reference.

BACKGROUND OF THE INVENTION

1. Field of the Invention

The present invention relates generally to hard-coated antiglare films, and polarizing plates and image displays including the same.

2. Description of the Related Art

With technical improvements in recent years, liquid crystal displays (LCDs), plasma display panels (PDPs), electroluminescence displays (ELDs), etc. have been developed in addition to conventional cathode ray tube (CRT) displays as image displays and have been used in practical applications. Particularly, with technical innovations of LCDs with respect to, for example, wide viewing angles, high resolution, high response, and good color reproduction, applications of LCDs are spreading from laptop personal computers and monitors to television sets. In an LCD, generally, a liquid crystal panel is used in which polarizing plates are disposed on both sides of a liquid crystal cell, respectively. Generally, in order to prevent scratches on the polarizing plate, the surface of the liquid crystal panel is subjected to a hard coating treatment. For the hard coating treatment, a hard-coated film is often used. The hard-coated film is subjected to an antiglare treatment for preventing a decrease in contrast due to reflection of outside light such as fluorescent light and sunlight as well as reflection of an image at the surface of the liquid crystal panel. Particularly with an increase in size of the screens of image displays, the number of image displays equipped with hard-coated antiglare films is increasing.

Recently, in order to improve image quality, the number of high definition image displays with small pixel sizes is increasing. In such high definition image displays, when a conventional hard-coated antiglare film is disposed, variations in brightness in pixels are emphasized further more to cause a visible failure (a failure due to glare) to result in considerably deteriorated image quality. Conventionally, in order to produce an antiglare laminate that allows high definition to be provided, a method has been employed in which the haze value of the antiglare layer is increased to eliminate glare. However, this method has a problem in that the contrast is decreased considerably because light is scattered intensively at the panel surface. Furthermore, in the case where the surface unevenness is increased to improve antiglare properties, there is a problem in so-called white blur in an oblique direction, that is, white blur is observed due to excessively intensive scattering of reflected light when the panel surface is viewed from the oblique direction. In the antiglare treatment, a method of producing an uneven shape of the film surface by adding, for example, inorganic or organic particles is used. Generally, although an improvement in antiglare properties and an improvement in contrast or white blur are considered to have a contradictory relationship, various proposals have been made to obtain both these properties. For example, it is being studied that aggregates with three-dimensional structures formed of the aforementioned particles are allowed to be present in an antiglare layer (see, for instance, JP 2005-316413 A). This, however, may cause scatter at the aggregates or may cause a fine pattern to appear in a hard-coated film. Furthermore, although a method that is effective in improving a part of properties has been proposed (see, for instance, JP 2003-4903 A and JP 4001320 B), a method that is effective in solving all the three problems described above has not been found.

SUMMARY OF THE INVENTION

The present invention is intended to provide a hard-coated antiglare film that increases visibility without deteriorating the properties of image displays such as LCDs with increased definition and contrast. That is, the present invention is intended to provide a hard-coated antiglare film that has excellent antiglare properties, allows high definition to be provided even in the case of a low haze value, and can prevent white blur in an oblique direction from occurring to improve in depth of black in black display, as well as a polarizing plate and an image display including the same.

In order to achieve the aforementioned object, a hard-coated antiglare film of the present invention includes a transparent plastic film substrate and a hard-coating antiglare layer containing fine particles on at least one surface of the transparent plastic film substrate, wherein an arithmetic average surface roughness Ra (μm) that is defined in JIS B 0601 (1994 version) is in the range of 0.05 to 0.15 μm in an uneven shape of a surface of the hard-coating antiglare layer, and the hard-coated antiglare film includes at least 80 convexities that exceed a roughness mean line of a surface roughness profile in a 4-mm long portion at an arbitrary location of the surface of the hard-coating antiglare layer.

A polarizing plate of the present invention includes a polarizer and a hard-coated antiglare film, wherein the hard-coated antiglare film is the hard-coated antiglare film of the present invention described above.

An image display of the present invention includes a hard-coated antiglare film or a polarizing plate, wherein the hard-coated antiglare film is the hard-coated antiglare film of the present invention described above, and the polarizing plate is the polarizing plate of the present invention described above.

The hard-coated antiglare film of the present invention can improve the bright-dark contrast considerably as compared to conventional hard-coated antiglare films that allow high definition to be provided, since even in a liquid crystal panel with high definition having a resolution of, for instance, about 130 ppi, glare can be prevented from occurring and furthermore, the haze value also can be decreased. The hard-coated antiglare film of the present invention has excellent antiglare properties by obtaining a characteristic uneven shape and can prevent white blur in an oblique direction from occurring. Since prevention of the white blur allows light to be prevented from being scattered in the front direction of an image display, the black brightness is suppressed and thereby the contrast in a bright place can be improved. This makes it possible to increase the depth of black in black display of an image display. Accordingly, an image display using a hard-coated antiglare film or a polarizing plate of the present invention has excellent display properties.

DETAILED DESCRIPTION OF THE INVENTION

Figure 1:
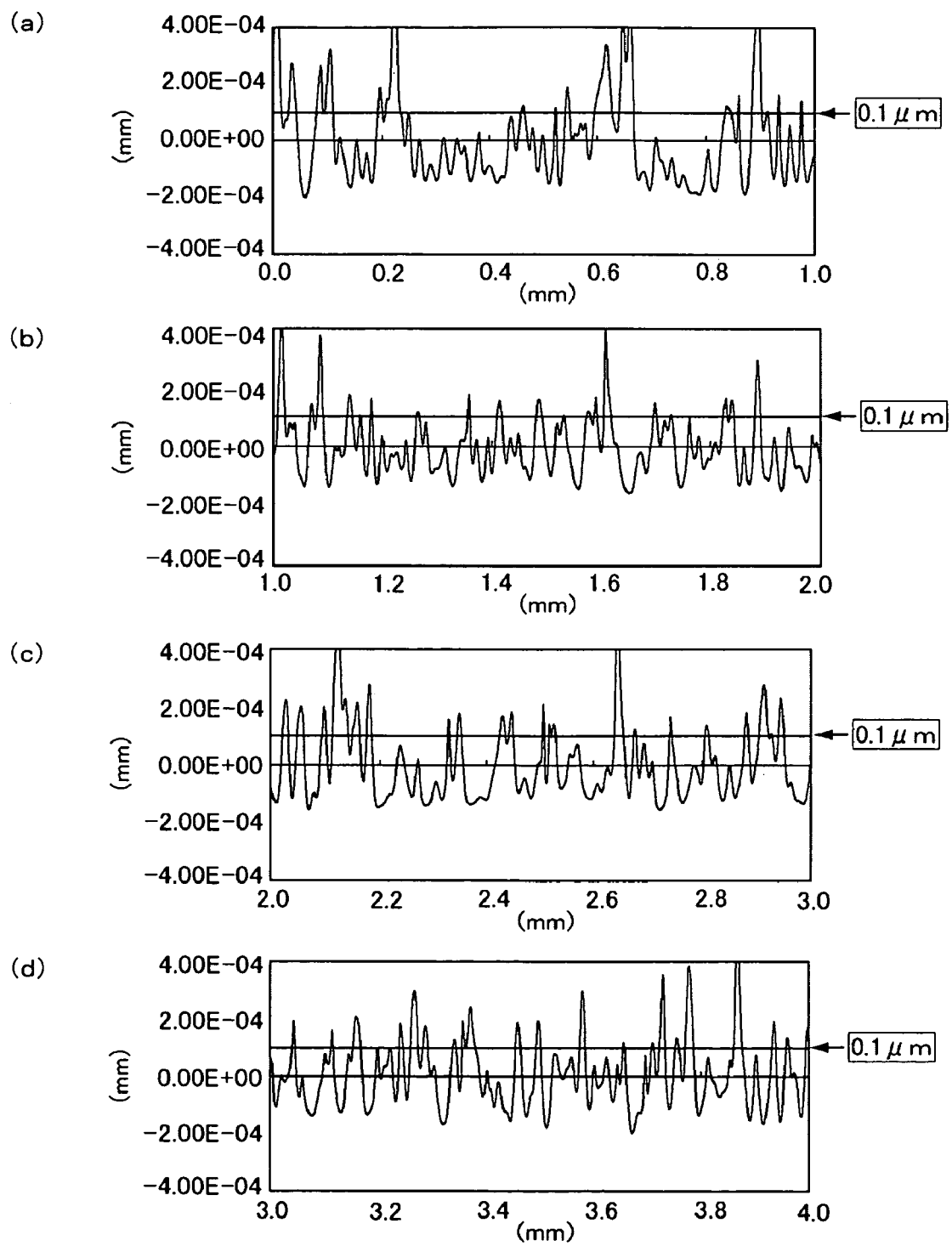
FIG. 1(a) is a diagram showing a profile, which indicates a range of 0 to 1 mm out of a measured length of 4 mm, of a sectional surface shape of a hard-coated antiglare film according to Example 1.
FIG. 1(b) is a diagram showing a profile, which indicates a range of 1 to 2 mm out of a measured length of 4 mm, of the sectional surface shape of the hard-coated antiglare film according to Example 1.
FIG. 1(c) is a diagram showing a profile, which indicates a range of 2 to 3 mm out of a measured length of 4 mm, of the sectional surface shape of the hard-coated antiglare film according to Example 1.
FIG. 1(d) is a diagram showing a profile, which indicates a range of 3 to 4 mm out of a measured length of 4 mm, of the sectional surface shape of the hard-coated antiglare film according to Example 1.
Figure 2:
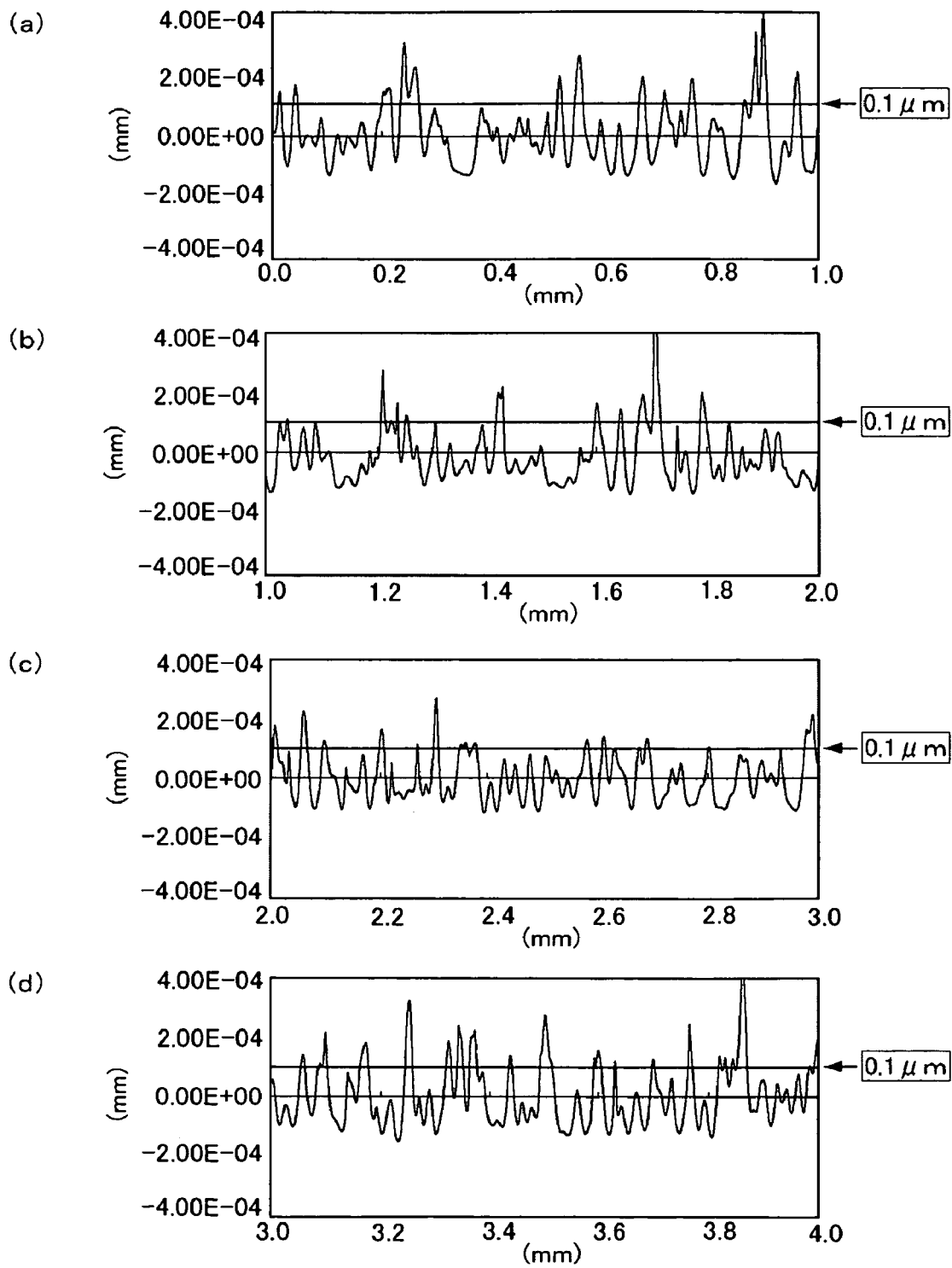
FIGS. 2(a) to (d) are diagrams showing profiles that indicate a measured length of 4 mm of a sectional surface shape of a hard-coated antiglare film according to Example 2; (a) shows a range of 0 to 1 mm, (b) a range of 1 to 2 mm, (c) a range of 2 to 3 mm, and (d) a range of 3 to 4 mm.
Figure 3:
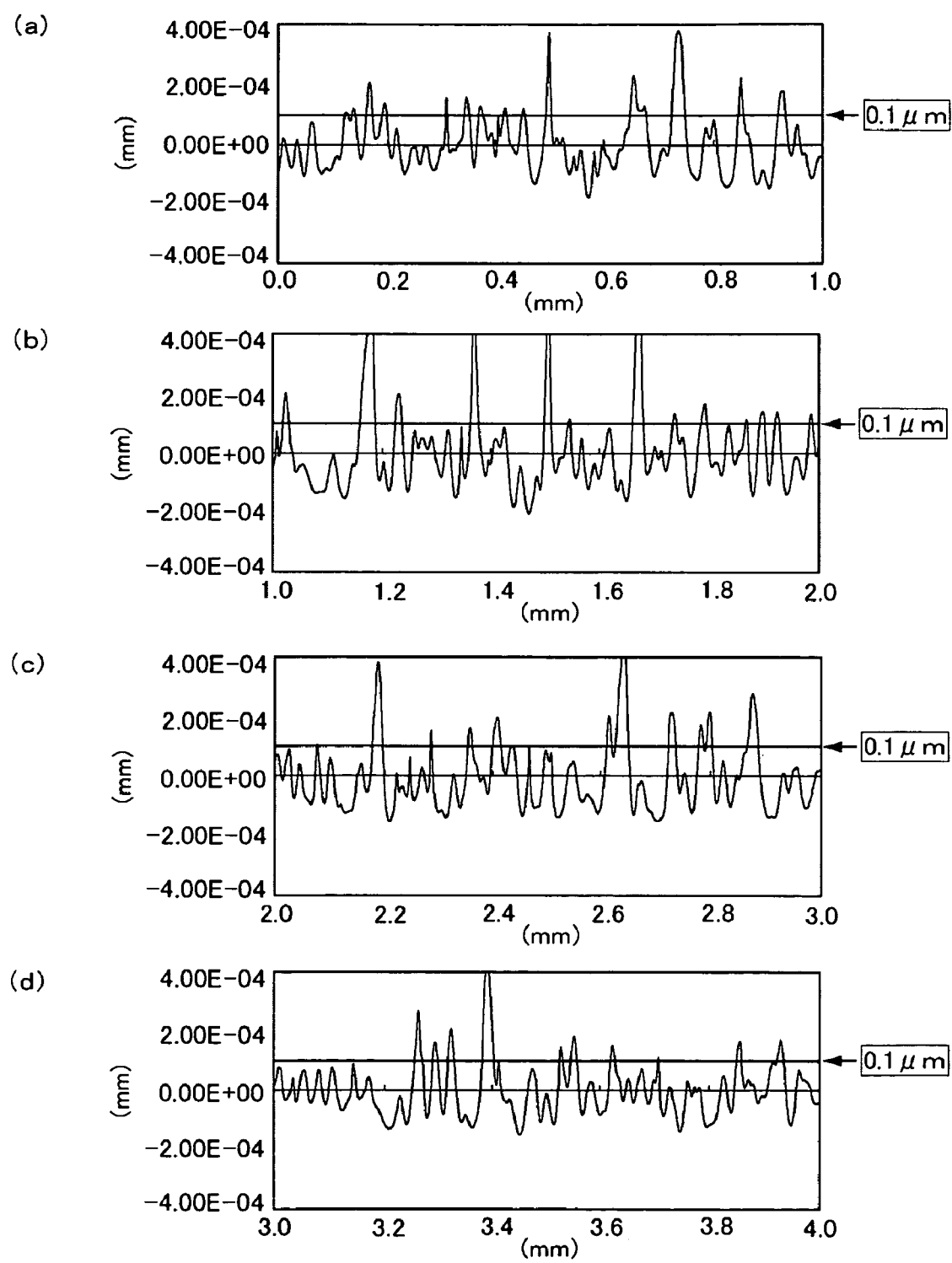
FIGS. 3(a) to (d) are diagrams showing profiles that indicate a measured length of 4 mm of a sectional surface shape of a hard-coated antiglare film according to Example 3; (a) shows a range of 0 to 1 mm, (b) a range of 1 to 2 mm, (c) a range of 2 to 3 mm, and (d) a range of 3 to 4 mm.
Figure 4:
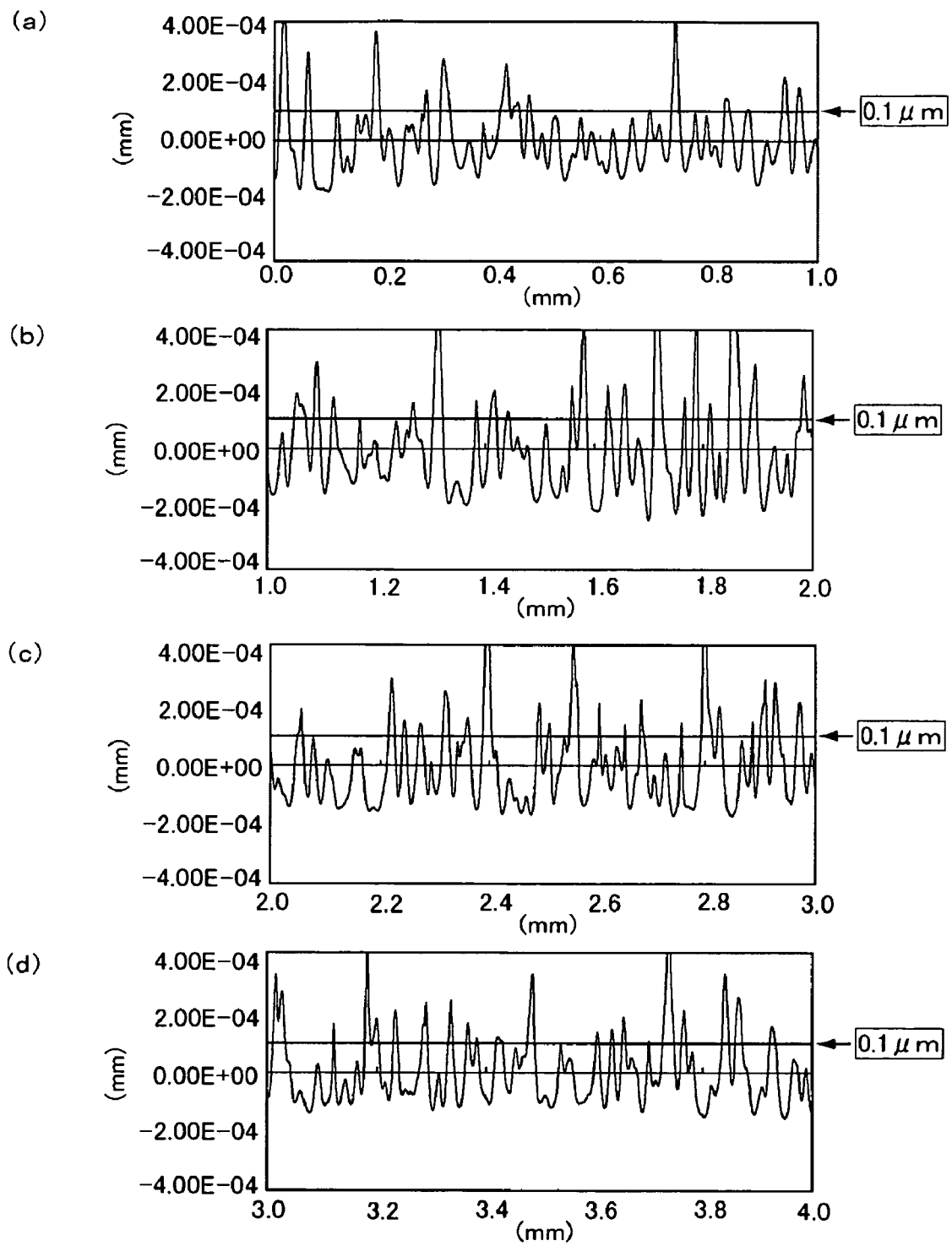
FIGS. 4(a) to (d) are diagrams showing profiles that indicate a measured length of 4 mm of a sectional surface shape of a hard-coated antiglare film according to Example 4; (a) shows a range of 0 to 1 mm, (b) a range of 1 to 2 mm, (c) a range of 2 to 3 mm, and (d) a range of 3 to 4 mm.
Figure 5:
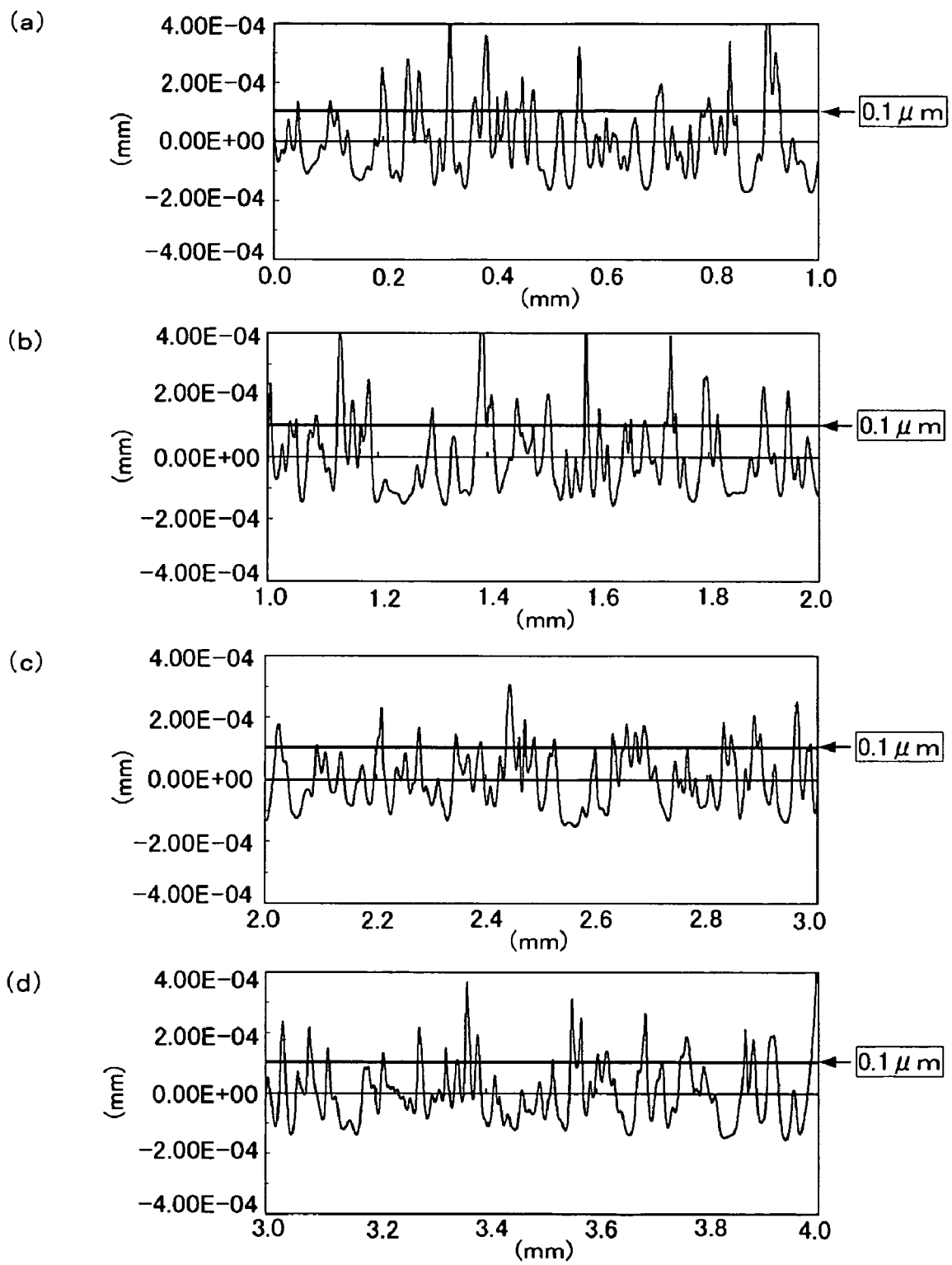
FIGS. 5(a) to (d) are diagrams showing profiles that indicate a measured length of 4 mm of a sectional surface shape of a hard-coated antiglare film according to Example 5; (a) shows a range of 0 to 1 mm, (b) a range of 1 to 2 mm, (c) a range of 2 to 3 mm, and (d) a range of 3 to 4 mm.
Figure 6:
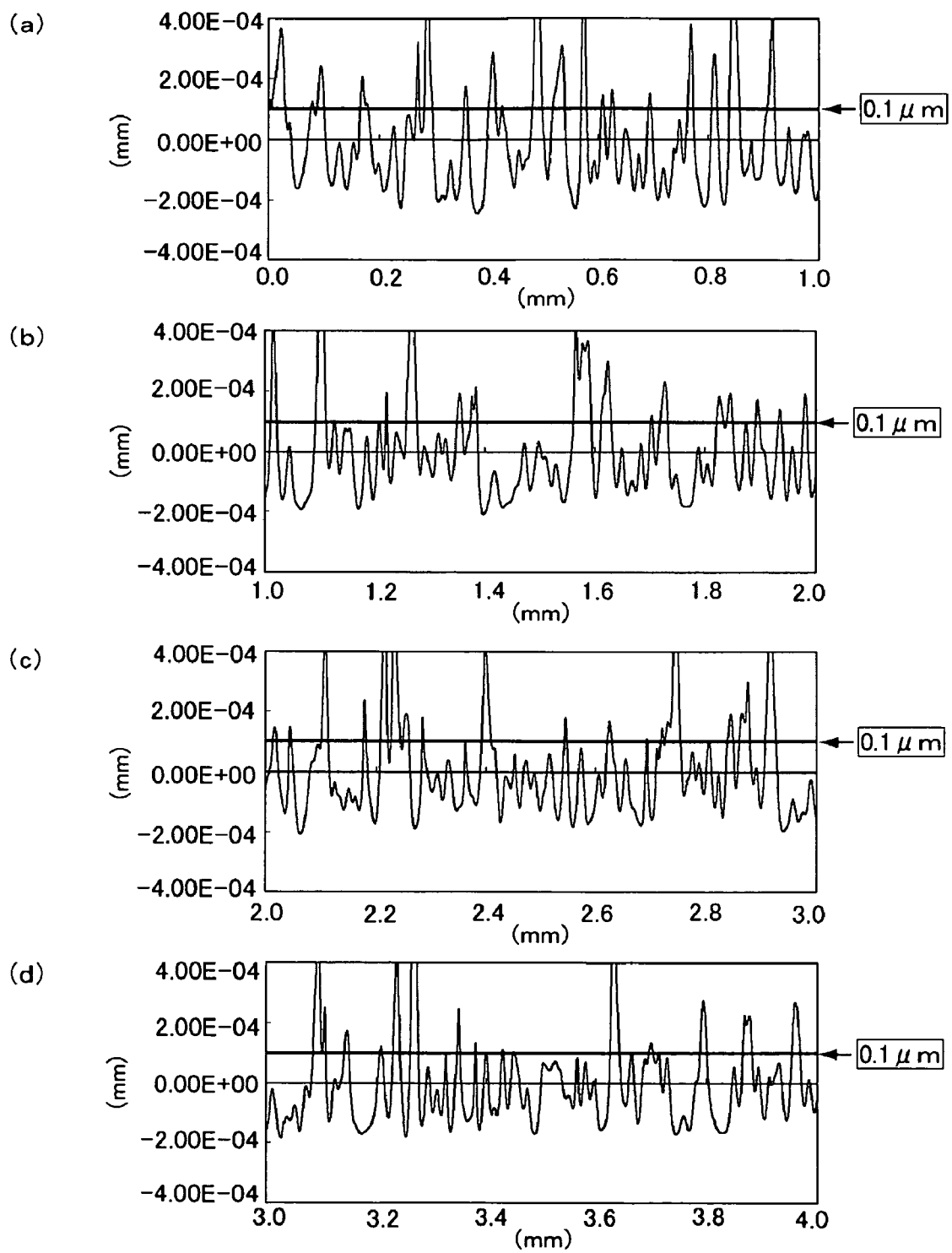
FIGS. 6(a) to (d) are diagrams showing profiles that indicate a measured length of 4 mm of a sectional surface shape of a hard-coated antiglare film according to Example 6; (a) shows a range of 0 to 1 mm, (b) a range of 1 to 2 mm, (c) a range of 2 to 3 mm, and (d) a range of 3 to 4 mm.
Figure 7:
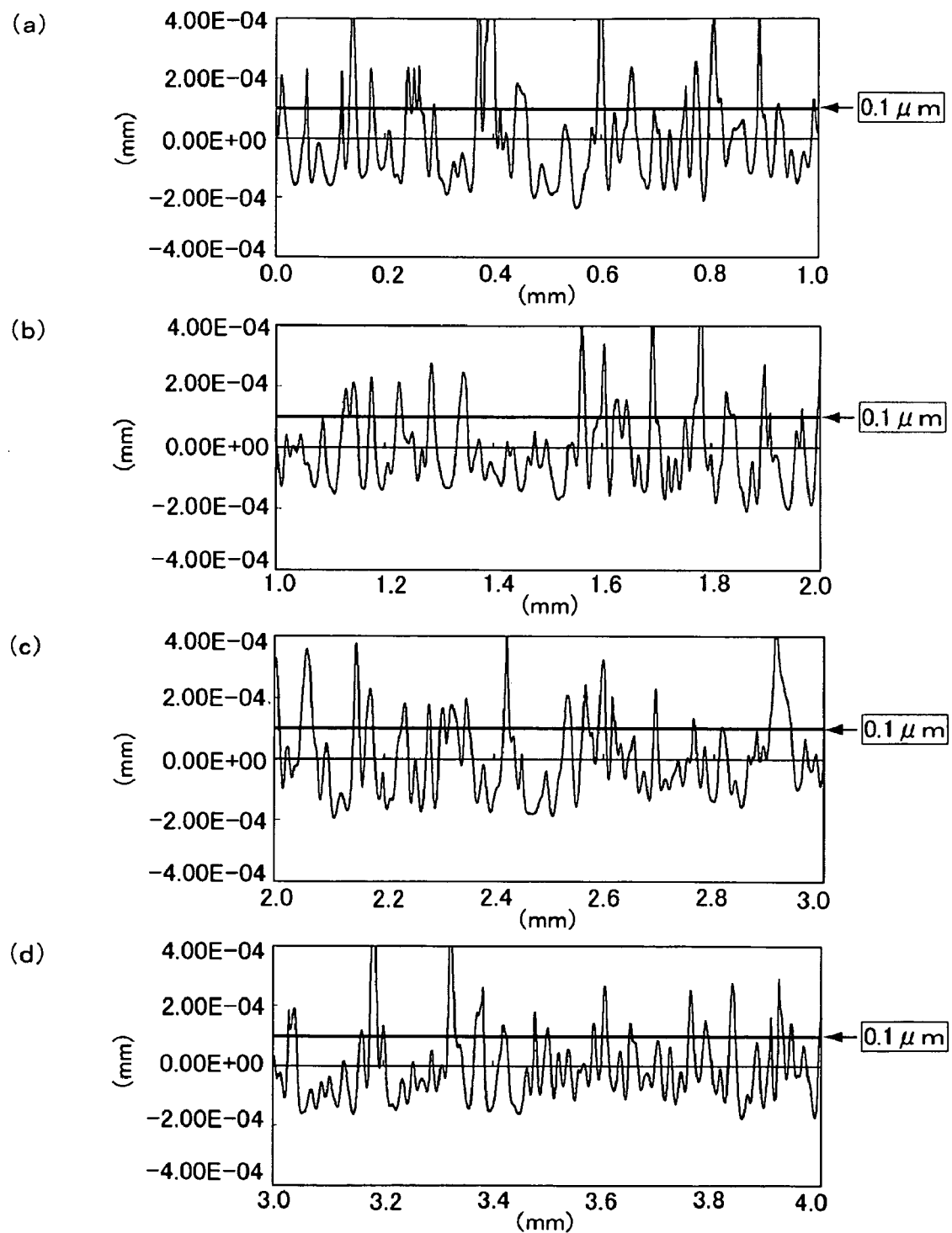
FIGS. 7(a) to (d) are diagrams showing profiles that indicate a measured length of 4 mm of a sectional surface shape of a hard-coated antiglare film according to Example 7; (a) shows a range of 0 to 1 mm, (b) a range of 1 to 2 mm, (c) a range of 2 to 3 mm, and (d) a range of 3 to 4 mm.
Figure 8:
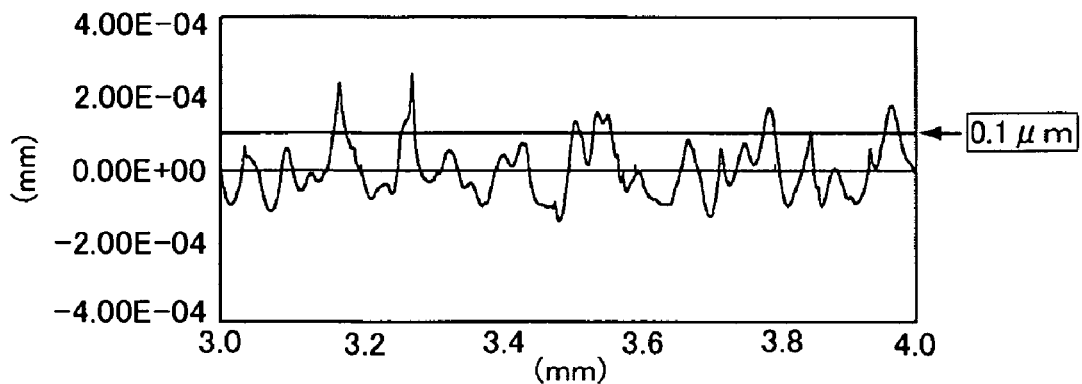
FIG. 8 is a diagram showing a profile that indicates a range of 3 to 4 mm out of a measured length of 4 mm of a sectional surface shape of a hard-coated antiglare film according to Comparative Example 1.
Figure 9:
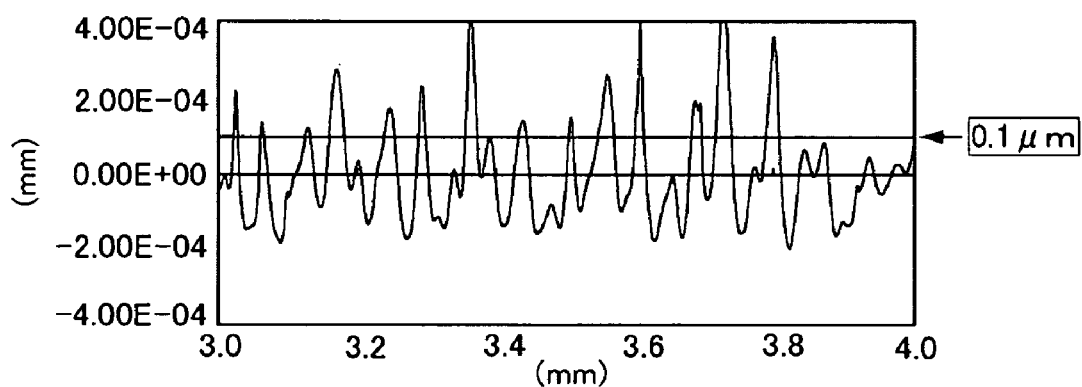
FIG. 9 is a diagram showing a profile that indicates a range of 3 to 4 mm out of a measured length of 4 mm of a sectional surface shape of a hard-coated antiglare film according to Comparative Example 2.
Figure 10:
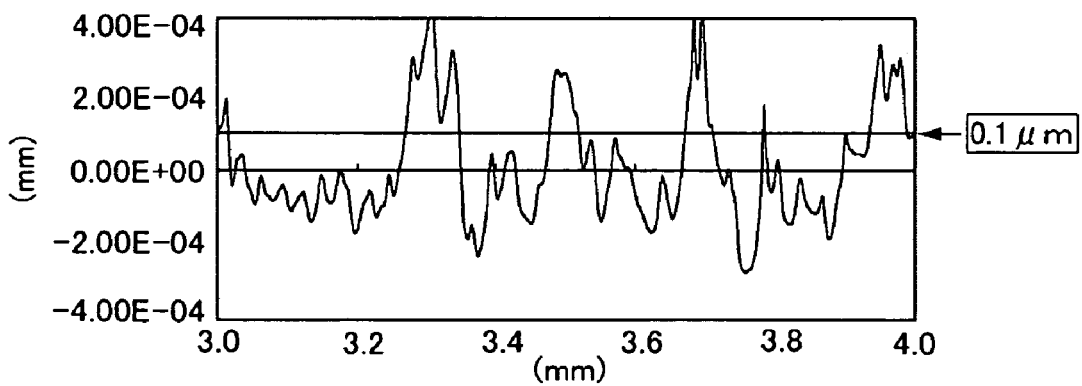
FIG. 10 is a diagram showing a profile that indicates a range of 3 to 4 mm out of a measured length of 4 mm of a sectional surface shape of a hard-coated antiglare film according to Comparative Example 3.
Figure 11:
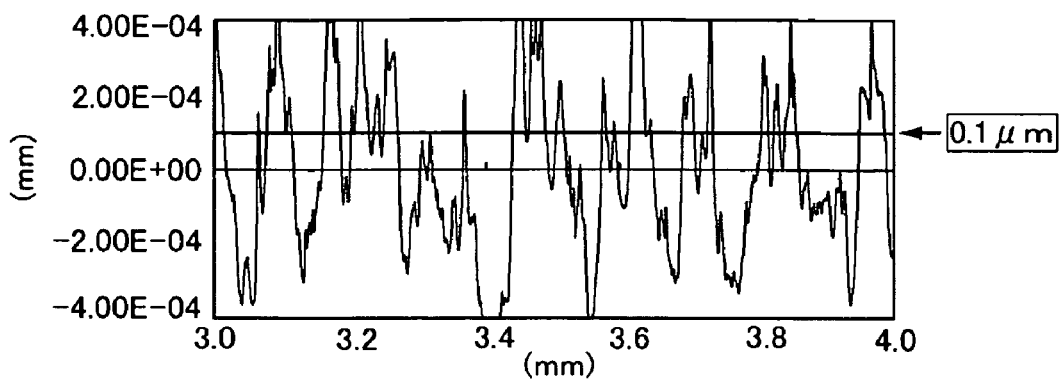
FIG. 11 is a diagram showing a profile that indicates a range of 3 to 4 mm out of a measured length of 4 mm of a sectional surface shape of a hard-coated antiglare film according to Comparative Example 4.
Figure 12:
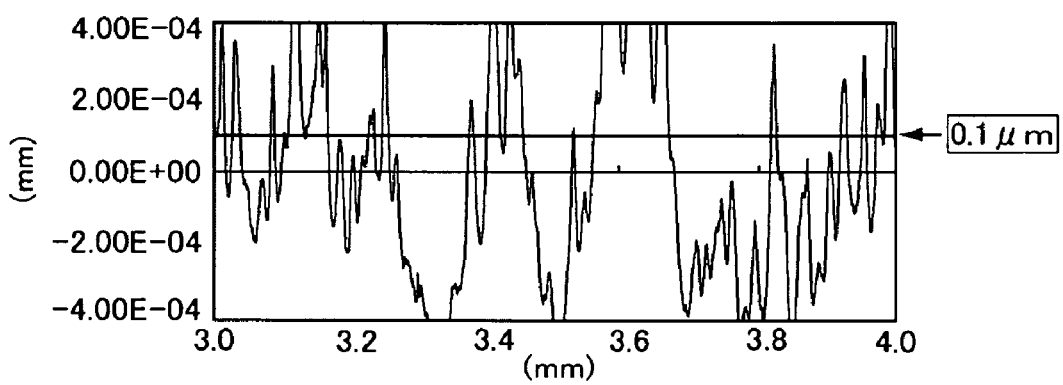
FIG. 12 is a diagram showing a profile that indicates a range of 3 to 4 mm out of a measured length of 4 mm of a sectional surface shape of a hard-coated antiglare film according to Comparative Example 5.
Figure 13:
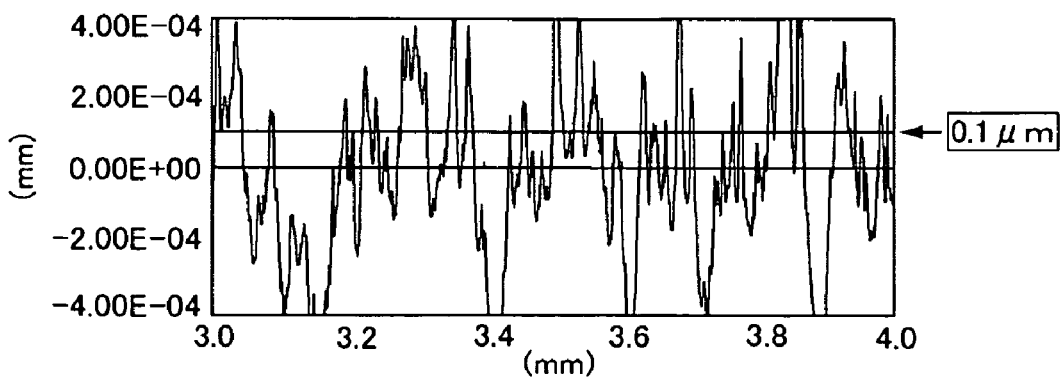
FIG. 13 is a diagram showing a profile that indicates a range of 3 to 4 mm out of a measured length of 4 mm of a sectional surface shape of a hard-coated antiglare film according to Comparative Example 6.

Preferably, the hard-coated antiglare film of the present invention includes convexities exceeding a standard line that is in parallel with the roughness mean line of the surface roughness profile and is located at a height of 0.1 µm, and includes at least 50 of the convexities in which line segments of portions of the standard line that cross the convexities each have a length of 20 µm or shorter in the 4-mm long portion at an arbitrary location of the surface of the hard-coating antiglare layer but does not include any convexities in which the line segments each have a length of 50 µm or longer.

Preferably, the hard-coated antiglare film of the present invention has a haze value in the range of 4 to 25%.

Preferably, in the hard-coated antiglare film of the present invention, the hard-coating antiglare layer is formed using the fine particles and a material for forming a hard-coating layer that contains the following components (A) and (B):

the component (A): a curable compound containing at least one of an acrylate group and a methacrylate group, and the component (B): particles that are formed by bonding inorganic oxide particles and an organic compound containing a polymerizable unsaturated group to each other.

Preferably, in the hard-coated antiglare film of the present invention, the component (B) has a weight average particle size of 200 nm or smaller.

Preferably, in the component (B), the inorganic oxide particles include particles of at least one type selected from the group consisting of silicon oxide, titanium oxide, aluminum oxide, zinc oxide, tin oxide, and zirconium oxide.

Preferably, the material for forming a hard-coating layer contains the component (B) in the range of 100 to 200 parts by weight per 100 parts by weight of the component (A).

Preferably, the difference in refractive index between the material for forming a hard-coating layer and the fine particles is in the range of 0.01 to 0.04, at least one type of spherical or amorphous fine particles, each of which has a weight average particle size in the range of 0.5 to 8 µm, are contained as the fine particles, and the fine particles are contained in the range of 3 to 10 parts by weight per 100 parts by weight of the material for forming a hard-coating layer.

Preferably, in the hard-coated antiglare film of the present invention, the hard-coating antiglare layer has a thickness in a range that is 1.2 to 3 times the weight average particle size of the fine particles.

Preferably, in the hard-coated antiglare film of the present invention, an antireflection layer is formed on the hard-coating antiglare layer.

Next, the present invention is described in detail. The present invention, however, is not limited by the following description.

The hard-coated antiglare film of the present invention includes a transparent plastic film substrate and a hard-coating antiglare layer formed on at least one surface of the transparent plastic film substrate.

The transparent plastic film substrate is not particularly limited. Preferably, the transparent plastic film substrate has a high visible light transmittance (preferably a light transmittance of at least 90%) and good transparency (preferably a haze value of 1% or lower). Examples of the material for forming the transparent plastic film substrate include polyester type polymers such as polyethylene terephthalate and polyethylenenaphthalate, cellulose type polymers such as diacetyl cellulose and triacetyl cellulose (TAC), polycarbonate type polymers, and acrylics type polymers such as polymethylmethacrylate. Examples of the material for forming the transparent plastic film substrate also include styrene type polymers such as polystyrene and an acrylonitrile-styrene copolymer, olefin type polymers such as polyethylene, polypropylene, polyolefin that has a cyclic or norbornene structure, and an ethylene-propylene copolymer, vinyl chloride type polymers, and amide type polymers such as nylon and aromatic polyamide. Furthermore, examples of the material for forming the transparent plastic film substrate also include imide type polymers, sulfone type polymers, polyether sulfone type polymers, polyether-ether ketone type polymers, polyphenylene sulfide type polymers, vinyl alcohol type polymers, vinylidene chloride type polymers, vinyl butyral type polymers, allylate type polymers, polyoxymethylene type polymers, epoxy type polymers and blends of the above-mentioned polymers. Among them, those having small optical birefringence are used suitably. The hard-coated antiglare film of the present invention can be used, for example, as a protective film for a polarizing plate. In this case, the transparent plastic film substrate is preferably a film formed of TAC, polycarbonate, an acrylic polymer, or a polyolefin having a cyclic or norbornene structure. In the present invention, as described below, the transparent plastic film substrate may be a polarizer itself. Such a structure does not need a protective layer formed of, for example, TAC and simplifies the structure of the polarizing plate. Accordingly, such a structure make it possible to reduce the number of steps for manufacturing polarizing plates or image displays and to increase production efficiency. In addition, such a structure allows polarizing plates to be formed of thinner layers. When the transparent plastic film substrate is a polarizer, the hard-coating antiglare layer serves as a conventional protective layer. In such a structure, the hard-coated antiglare film also functions as a cover plate in a case where it is attached to the surface of a liquid crystal cell, for example.

In the present invention, the thickness of the transparent plastic film substrate is not particularly limited. For example, the thickness is preferably 10 to 500 μm, more preferably 20 to 300 μm, and most suitably 30 to 200 μm, with consideration given to strength, workability such as handling properties, and thin layer properties. The refractive index of the transparent plastic film substrate is not particularly limited. The refractive index is, for example, in the range of 1.30 to 1.80 and preferably, in the range of 1.40 to 1.70.

The hard-coating antiglare layer is formed using the fine particles and the material for forming a hard-coating layer. Examples of the material for forming a hard-coating layer include thermosetting resin and ionizing radiation curable resin that is cured with ultraviolet rays or light. It also is possible to use, for example, a commercial thermosetting resin or ultraviolet curable resin as the material for forming a hard-coating layer. Preferably, however, the material for forming a hard-coating layer contains, for example, the following components (A) and (B):

the component (A): a curable compound containing at least one of an acrylate group and a methacrylate group, and the compound (B): particles that are formed by bonding inorganic oxide particles and an organic compound containing a polymerizable unsaturated group to each other.

A curable compound having at least one of an acrylate group and a methacrylate group that is cured by, for example, heat, light (for instance, ultraviolet light), or an electron beam can be used as the component (A). Examples of the component (A) include silicone resin, polyester resin, polyether resin, epoxy resin, urethane resin, alkyd resin, spiroacetal resin, polybutadiene resin, polythiolpolyene resin, and oligomer or prepolymer of, for example, acrylate or methacrylate of a polyfunctional compound such as polyhydric alcohol. One of these may be used independently or two or more of them may be used in combination.

For example, a reactive diluent having at least one of an acrylate group and a methacrylate group also can be used as the component (A). Examples of the reactive diluent include monofunctional acrylate, monofunctional methacrylate, polyfunctional acrylate, and polyfunctional methacrylate. Examples of the monofunctional acrylate include ethylene oxide-modified phenol acrylate, propylene oxide-modified phenol acrylate, ethylene oxide-modified nonylphenol acrylate, propylene oxide-modified nonylphenol acrylate, 2-ethylhexylcarbitol acrylate, isobornyl acrylate, tetrahydrofurfuryl acrylate, hydroxyethyl acrylate, hydroxypropyl acrylate, hydroxybutyl acrylate, hydroxyhexyl acrylate, diethylene glycol monoacrylate, triethylene glycol monoacrylate, and tripropylene glycol monoacrylate. Examples of the monofunctional methacrylate include ethylene oxide-modified phenol methacrylate, propylene oxide-modified phenol methacrylate, ethylene oxide-modified nonylphenol methacrylate, propylene oxide-modified nonylphenol methacrylate, 2-ethylhexylcarbitol methacrylate, isobornyl methacrylate, tetrahydrofurfuryl methacrylate, hydroxyethyl methacrylate, hydroxypropyl methacrylate, hydroxybutyl methacrylate, hydroxyhexyl methacrylate, diethylene glycol monomethacrylate, triethylene glycol monomethacrylate, and tripropylene glycol monomethacrylate. Examples of the polyfunctional acrylate include diethylene glycol diacrylate, triethylene glycol diacrylate, dipropylene glycol diacrylate, tripropylene glycol diacrylate, tetrapropylene glycol diacrylate, polypropylene glycol diacrylate, 1,4-butane diol diacrylate, neopentyl glycol diacrylate, 1,6-hexanediol diacrylate, ethylene oxide-modified neopentyl glycol diacrylate, ethylene oxide-modified bisphenol A diacrylate, propylene oxide-modified bisphenol A diacrylate, ethylene oxide-modified hydrogenated bisphenol A diacrylate, trimethylol propane diacrylate, trimethylol propane allyl ether diacrylate, trimethylol propane triacrylate, ethylene oxide-modified trimethylol propane triacrylate, propylene oxide-modified trimethylol propane triacrylate, pentaerythritol tetraacrylate, dipentaerythritol tetraacrylate, and dipentaerythritol hexaacrylate. Examples of the polyfunctional methacrylate include diethylene glycol dimethacrylate, triethylene glycol dimethacrylate, dipropylene glycol dimethacrylate, tripropylene glycol dimethacrylate, tetrapropylene glycol dimethacrylate, polypropylene glycol dimethacrylate, 1,4-butane diol dimethacrylate, neopentyl glycol dimethacrylate, 1,6-hexanediol dimethacrylate, ethylene oxide-modified neopentyl glycol dimethacrylate, ethylene oxide-modified bisphenol A dimethacrylate, propylene oxide-modified bisphenol A dimethacrylate, ethylene oxide-modified hydrogenated bisphenol A dimethacrylate, trimethylol propane dimethacrylate, trimethylol propane allyl ether dimethacrylate, trimethylol propane trimethacrylate, ethylene oxide-modified trimethylol propane trimethacrylate, propylene oxide-modified trimethylol propane trimethacrylate, pentaerythritol tetramethacrylate, dipentaerythritol tetramethacrylate, and dipentaerythritol hexamethacrylate. The reactive diluent is preferably trifunctional or higher-functional acrylate, or trifunctional or higher-functional methacrylate. This is because it allows the hard-coating antiglare layer to have higher hardness. Examples of the component (A) include butanediol glycerol ether diacrylate, isocyanurate acrylate, and isocyanurate methacrylate. For the component (A), one type can be used independently, or two types or more can be used in combination.

The component (B) is as described above. In the component (B), the inorganic oxide particles can be fine particles of, for example, silicon oxide (silica), titanium oxide, aluminum oxide, zinc oxide, tin oxide, or zirconium oxide. Particularly, fine particles of silicon oxide (silica), titanium oxide, aluminum oxide, zinc oxide, tin oxide, and zirconium oxide are preferable. One of these may be used independently or two or more of them may be used in combination.

In the hard-coated antiglare film of the present invention, in terms of prevention of scattering of light, prevention of a decrease in transmittance of a hard-coating layer, prevention of coloring, and transparency, the component (B) is preferably so-called nanoparticles whose weight average particle size is in the range of 1 nm to 200 nm. The weight average particle size can be measured by the method described later in the section of Examples. The weight average particle size is more preferably in the range of 1 nm to 100 nm. The inventors found that when the component (B), nanoparticles, was added to the component (A), the movement of the fine particles was changed during coating and drying steps according to, for example, the selection of the solvent described later. In other words, in a system including nanoparticles added thereto, surface unevenness tended not to be formed by the fine particles when a particular solvent was used, while the unevenness tended to be formed when another particular solvent was used. When the nanoparticles were not contained, the uneven surface shape did not differ significantly according to the type of the solvent. With consideration given to these phenomena, it can be surmised that since repulsive force is imposed on nanoparticles and fine particles when the nanoparticles are contained, the fine particles tend to be dispersed relatively uniformly and the movement of the fine particles can be controlled easily during the coating and drying steps, and therefore, the number of parts of the fine particles to be added can be reduced and the uneven surface shape of the present invention can be produced effectively. However, the present invention is neither limited nor restricted by this surmise.

In the component (B), the inorganic oxide particles are bonded (surface-modified) with an organic compound containing a polymerizable unsaturated group. The polymerizable unsaturated group is reacted with the component (A) to be cured, which results in an increase in hardness of the hard-coating layer. Preferable examples of the polymerizable unsaturated group include an acryloyl group, methacryloyl group, vinyl group, propenyl group, butadienyl group, styryl group, ethynyl group, cinnamoyl group, maleate group, and acrylamide group. The organic compound containing the polymerizable unsaturated group is preferably a compound containing a silanol group inside a molecule or a compound that produces a silanol group through hydrolysis. It also is preferable that the organic compound containing the polymerizable unsaturated group be one containing a photosensitive group.

The amount of the component (B) to be added is preferably in the range of 100 to 200 parts by weight per 100 parts by weight of the component (A). When the amount of the component (B) to be added is 100 parts by weight or more, the hard-coated antiglare film can be prevented more effectively from curling and bending. When the amount is 200 parts by weight or less, high scratch resistance and pencil hardness can be obtained. The amount of the component (B) to be added is more preferably in the range of 100 to 150 parts by weight per 100 parts by weight of the component (A).

Adjustment in the amount of the component (B) to be added allows, for example, the refractive index of the hard-coating antiglare layer to be controlled. In the case where the antireflection layer to be described later is not provided, it is advantageous that the hard-coating antiglare layer is allowed to have a lower refractive index in order to reduce the reflectance. In the case where an antireflection layer (low refractive index layer) is provided, it is possible to uniformly reduce the reflection of light in a visible light wavelength range by increasing the refractive index of the hard-coating antiglare layer.

The fine particles for forming the hard-coating antiglare layer have main functions of providing it with antiglare properties by forming the surface of the hard-coating antiglare layer to be formed into an uneven shape and controlling the haze value of the hard-coating antiglare layer. Controlling the difference in refractive index between the fine particles and the material for forming a hard-coating layer allows the haze value of the hard-coating antiglare layer to be designed. Examples of the fine particles include inorganic fine particles and organic fine particles. The inorganic fine particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. The organic fine particles are not particularly limited. Examples thereof include polymethyl methacrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. With respect to these inorganic fine particles and organic fine particles, one of them may be used independently or two or more of them may be used in combination.

The weight average particle size of the fine particles is preferably in the range of 0.5 to 8 μm. When the weight average particle size of the fine particles exceeds the aforementioned range, the image sharpness is reduced. On the other hand, when it is smaller than the aforementioned range, sufficiently high antiglare properties cannot be obtained and thereby a problem of increased glare tends to arise. The weight average particle size of the fine particles is more preferably in the range of 2 to 6 μm and further preferably in the range of 3 to 6 μm. Furthermore, it also is preferable that the weight average particle size of the fine particles be in the range of 30 to 80% of the thickness of the hard-coating antiglare layer. The weight average particle size of the fine particles can be measured by the Coulter counting method. For instance, a particle size distribution measurement apparatus (Coulter Multisizer (trade name), manufactured by Beckman Coulter, Inc.) using a pore electrical resistance method is used to measure electrical resistance of an electrolyte corresponding to the volume of the fine particles when the fine particles pass through the pores. Thus, the number and volume of the fine particles are measured and then the weight average particle size is calculated.

The shape of the fine particles is not particularly limited. For instance, they can have a bead-like, substantially spherical shape or can have an indeterminate shape like powder. However, the fine particles preferably have a substantially spherical shape, more preferably a substantially spherical shape with an aspect ratio of 1.5 or lower, and most preferably a spherical shape.

The ratio of the fine particles to be added is preferably in the range of 3 to 10 parts by weight and more preferably in the range of 5 to 8 parts by weight, per 100 parts by weight of the material for forming a hard-coating layer.

The thickness of the hard-coating antiglare layer is preferably in the range that is 1.2 to 3 times and more preferably 1.2 to 2 times the weight average particle size of the fine particles. Furthermore, from the viewpoints of coating properties and pencil hardness, the thickness of the hard-coating antiglare layer is preferably in the range of 8 to 12 μm, and it is preferable that the weight average particle size of the fine particles be adjusted so that the thickness is in this thickness range. The thickness in the predetermined range makes it easy to obtain the surface shape of the hard-coated antiglare film of the present invention, in which a large number of fine concavities and convexities are present independently, and sufficiently high hardness (for instance, a pencil hardness of at least 4H) of the hard-coating antiglare layer. Furthermore, the thickness exceeding the above-mentioned range causes problems in that the hard-coated antiglare film curls considerably to have deteriorated line traveling performance during the coating and further in that antiglare properties are deteriorated. On the other hand, when the thickness is less than the predetermined range described above, there is a problem in that glare cannot be prevented from occurring and thereby the sharpness deteriorates.

Preferably, the hard-coated antiglare film of the present invention has a haze value in the range of 4 to 25%. The aforementioned haze value is a haze value (cloudiness) according to JIS K 7136 (2000 version). The haze value is more preferably in the range of 5 to 15% and further preferably in the range of 5 to 10%. In order to obtain a haze value in the aforementioned range, it is preferable that the fine particles and the material for forming a hard-coating layer be selected so that the difference in refractive index between the fine particles and the material for forming a hard-coating layer is in the range of 0.01 to 0.04. A haze value in the aforementioned range allows a clear image to be obtained and can improve the contrast in a dark place. When the haze value is excessively low, a failure due to glare tends to occur.

In the hard-coated antiglare film of the present invention, an arithmetic average surface roughness Ra that is defined in JIS B 0601 (1994 version) is in the range of 0.05 to 0.15 μm in the uneven shape of the surface of the hard-coating antiglare layer, and the hard-coated antiglare film includes at least 80 convexities that exceed the roughness mean line of the surface roughness profile in a 4-mm long portion at an arbitrary location of the surface of the hard-coating antiglare layer. The Ra is more preferably in the range of 0.07 to 0.12 μm and further preferably in the range of 0.08 to 0.10 μm. In order to prevent reflections of an image and outside light at the surface of the hard-coated antiglare film, a certain degree of surface roughness is required and an Ra of 0.05 μm or more allows the reflections to be reduced. Furthermore, in order to prevent white blur from occurring, an Ra of 0.15 μm or less is required and further it is advantageous not to have roughness in the whole surface but to have an uneven shape of the surface such as one having undulation or fine concavities and convexities sparsely. In the case of the hard-coated antiglare film in which the number of the convexities is at least 80 and the Ra is 0.15 μm or less, when it is used in, for example, an image display, the reflected light can be prevented from scattering when viewed from an oblique direction, which results in a reduction in white blur and also in an improvement in the contrast in a bright place. The number of convexities is more preferably in the range of 80 to 110 and further preferably in the range of 90 to 100. When the number of the convexities is less than 80, glare tends to occur. On the other hand, when it exceeds 110, white blur tends to become intensive.

Preferably, the hard-coated antiglare film of the present invention has an arithmetic average surface roughness Ra in the range of 0.05 to 0.15 μm in an uneven shape of the surface of the hard-coating antiglare layer and includes convexities exceeding a standard line that is in parallel with the roughness mean line of the surface roughness profile and is located at a height of 0.1 μm. Although the standard line that is located at a height of 0.1 μm crosses the convexities, it is preferable that the sizes of the convexities be those in which line segments of portions of the standard line that cross the convexities each have a length of shorter than 50 μm and furthermore, at least 50 of the convexities in which the line segments each have a length of 20 μm or shorter be formed in a 4-mm long portion at an arbitrary location of the surface of the hard-coating antiglare layer. A lower number of convexities in which the line segments each have a length of 20 μm or shorter is not preferable in terms of antiglare properties and also tend to cause glare to occur. On the other hand, the presence of convexities in which the line segments each have a length of 50 μm or longer tends to cause glare to occur. In the case of a hard-coated antiglare film including no convexities in which the line segments each have a length of 50 μm or longer, at least 50 convexities in which the line segments each have a length of 20 μm or shorter are formed, and the Ra is 0.15 μm or less, the presence of a large number of relatively uniform fine concavities and convexities allows scattering to occur uniformly in an excellent manner and glare can be prevented from occurring even in a high definition panel. The number of the convexities in which the length is 20 μm or shorter is preferably in the range of 50 to 90 and more preferably in the range of 60 to 80. An excessively large number of convexities in which the line segments each have a length of 20 μm or shorter tends to cause intensive white blur.

As is defined by the Ra and the size and number of the convexities, the hard-coated antiglare film of the present invention includes a large number of independent fine concavities and convexities, preferably includes a predetermined number of independent fine concavities and convexities in which the line segments each have a length of 20 μm or shorter but no convexities in which the line segments each have a length of 50 μm or longer, and further preferably has inner scatter defined by the haze value in the aforementioned range, which allows both the improvement in antiglare properties and the elimination of glare to be obtained.

The hard-coated antiglare film of the present invention can be manufactured as follows. That is, for example, a material for forming a hard-coating antiglare layer is prepared that contains the fine particles, the material for forming a hard-coating layer, and a solvent, the material for forming a hard-coating antiglare layer is applied onto at least one surface of the transparent plastic film substrate to form a coating film, and the coating film is then cured to form the hard-coating antiglare layer. In the manufacture of the hard-coated antiglare film according to the present invention, it also is possible to use, for example, a transfer method using a mold and a method of providing an uneven shape by a suitable method such as sandblast or embossing roll, in combination.

The solvent is not particularly limited and various solvents can be used. However, in order to obtain the hard-coated antiglare film of the present invention, the optimum type and ratio of the solvent exist according to, for example, the composition of the material for forming a hard-coating layer, the type of fine particles, and the content thereof. Examples of the solvent include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone (MEK), diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, and propylene glycol monomethyl ether. One of these may be used independently or two or more of them may be used in combination.

For example, when 5 parts by weight of fine particles are added to each material for forming a hard-coating layer that was used in the examples described later, thereby the solid concentration is 45% by weight, and the thickness of the hard-coating antiglare layer is about 10 μm, a hard-coated antiglare film having the properties of the present invention can be obtained in which the ratio of MIBK/MEK is in the range of at least 1.5/1 to 2.0/1 (weight ratio). In the case of butyl acetate/MEK, a hard-coated antiglare film having the properties of the present invention in the range of at least 1.5/1 to 3.0/1 (weight ratio) can be obtained. As in the case of the materials for forming a hard-coating layer that were used in the examples described later, when the component (B) is nanoparticles, it is surmised that the dispersed state of the nanoparticles and the fine particles is changed according to, for instance, the type and mixing ratio of the solvent, which results in a change in tendency of concavities and convexities at the surface of the hard-coating antiglare layer. However, the present invention is neither limited nor restricted by this surmise. In the case of, for example, the materials for forming a hard-coating layer described later, concavities and convexities tend to be formed at the surface when the solvent is, for example, MEK, cyclopentanone, ethyl acetate, or acetone, while concavities and convexities tend not to be formed at the surface when the solvent is, for example, MIBK, toluene, butyl acetate, 2-propanol, or ethanol. Accordingly, in order to obtain a hard-coated antiglare film having the properties of the present invention, it also is preferable that the surface shape be controlled through selection of the type and ratio of the solvent.

Various types of leveling agents can be added to the material for forming a hard-coating antiglare layer. The leveling agent may be, for example, a fluorine or silicone leveling agent, preferably a silicone leveling agent. Examples of the silicon leveling agent include a reactive silicone, polydimethylsiloxane, polyether-modified polydimethylsiloxane, and polymethylalkylsiloxane. Among these silicone leveling agents, the reactive silicone is particularly preferred. Addition of the reactive silicone can impart lubricity to the surface and maintain scratch resistance over a long period of time. In the case of using a reactive silicone containing a hydroxyl group, as described later, when an antireflection layer (a low refractive index layer) containing a siloxane component is formed on the hard-coating antiglare layer, the adhesion between the antireflection layer and the hard-coating antiglare layer is improved.

The amount of the leveling agent to be added can be, for example, 5 parts by weight or less, preferably in the range of 0.01 to 5 parts by weight, per 100 parts by weight of entire resin components.

If necessary, the material for forming a hard-coating antiglare layer may contain, for example, a pigment, a filler, a dispersing agent, a plasticizer, an ultraviolet absorbing agent, a surfactant, an antifoulant, an antioxidant, or a thixotropy-imparting agent, as long as the performance is not impaired. One of these additives may be used independently, or two or more of them may be used in combination.

In the material for forming a hard-coating antiglare layer, any conventionally known photopolymerization initiator can be used. Examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

Examples of the method for applying the material for forming a hard-coating antiglare layer onto the transparent plastic film substrate include coating methods such as fountain coating, die coating, spin coating, spray coating, gravure coating, roll coating, and bar coating.

The material for forming a hard-coating antiglare layer is applied to form a coating film on the transparent plastic film substrate and then the coating film is cured. Preferably, the coating film is dried before being cured. The drying can be carried out by, for example, allowing it to stand, air drying by blowing air, drying by heating, or a combination thereof.

The method of curing the coating film formed of the material for forming a hard-coating antiglare layer is not particularly limited but is preferably thermal curing or ionizing radiation curing and more preferably ionizing radiation curing. Various types of activation energy can be used for the ionizing radiation curing method but ultraviolet light is preferable. Preferred examples of the energy radiation source include radiation sources such as high-pressure mercury lamps, halogen lamps, xenon lamps, metal halide lamps, nitrogen lasers, electron beam accelerators, and radioactive elements. The amount of irradiation with the energy radiation source is preferably 50 to 500 $mJ/cm^2$ in terms of accumulative exposure at an ultraviolet wavelength of 365 nm. When the amount of irradiation is at least 50 $mJ/cm^2$, the material can be cured more sufficiently and the resulting hard-coating antiglare layer also has a further sufficiently high hardness. When the amount of irradiation is 500 $mJ/cm^2$ or lower, the resulting hard-coating antiglare layer can be prevented from being colored.

As described above, a hard-coated antiglare film of the present invention can be manufactured by forming the hard-coating antiglare layer on at least one surface of the transparent plastic film substrate. The hard-coated antiglare film of the present invention can be manufactured by manufacturing methods other than that described above. The hard-coated antiglare film of the present invention can have, for example, a hardness of at least 2H in terms of pencil hardness, although it is affected by the thickness of the layer.

An example of the hard-coated antiglare film of the present invention is one with a hard-coating antiglare layer formed on one surface of a transparent plastic film substrate. The hard-coating antiglare layer contains fine particles and thereby the surface of the hard-coating antiglare layer has an uneven shape. In this example, the hard-coating antiglare layer is formed on one surface of the transparent plastic film substrate, but the present invention is not limited thereto. It may be a hard-coated antiglare film with hard-coating antiglare layers formed on both surfaces of the transparent plastic film substrate. Furthermore, the hard-coating antiglare layer of this example is a monolayer, but the present invention is not limited thereto. The hard-coating antiglare layer may have a multilayer structure in which at least two layers are stacked together.

In the hard-coated antiglare film of the present invention, an antireflection layer (low refractive index layer) may be disposed on the hard-coating antiglare layer. The hard-coated antiglare film of this example has a structure in which a hard-coating antiglare layer containing fine particles is formed on one surface of a transparent plastic film substrate and an antireflection layer is formed on the hard-coating antiglare layer. Light that is incident on an object undergoes reflection at the interface, absorption and scattering in the interior, and any other phenomena repeatedly until it goes through the object and reaches the back side thereof. For example, light reflection at the interface between air and the hard-coating antiglare layer is one of the factors that cause a reduction in visibility of images when an image display is equipped with the hard-coated antiglare film. The antireflection layer reduces the surface reflection. The hard-coating antiglare layers and the antireflection layers may be formed on both surfaces of the transparent plastic film substrate, respectively. Furthermore, the hard-coating antiglare layer and the antireflection layer each may have a multilayer structure in which at least two layers are stacked together.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out by using the effect of interference of light. The wavelength range of visible light that allows the antireflection function to be produced is, for example, 380 to 780 nm, and the wavelength range in which the visibility is particularly high is in the range of 450 to 650 nm. Preferably, the antireflection layer is designed to have a minimum reflectance at the center wavelength 550 nm of the range.

When the antireflection layer is designed based on the effect of interference of light, the interference effect can be enhanced by, for example, a method of increasing the difference in refractive index between the antireflection layer and the hard-coating antiglare layer. Generally, in an antireflection multilayer having a structure including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and the spectral reflection characteristics also can be made even (flat) in the visible light range. Since each layer of the thin optical film must be precise in thickness, a dry process such as vacuum deposition, sputtering, or CVD is generally used to form each layer.

For the antireflection multilayer, one with a two-layer structure is preferred, in which a low refractive index silicon oxide layer (with a refractive index of about 1.45) is stacked on a high refractive index titanium oxide layer (with a refractive index of about 1.8). One with a four-layer structure is more preferable, in which a silicon oxide layer is stacked on a titanium oxide layer, another titanium oxide layer is stacked thereon, and then another silicon oxide layer is stacked thereon. The formation of the two- or four-layered antireflection layer can evenly reduce reflection over the visible light wavelength range (for example, in the range of 380 to 780 nm).

The antireflection effect can also be produced by forming a thin monolayer optical film (an antireflection layer) on the hard-coating antiglare layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as UV-curable acrylic resins; hybrid materials such as a dispersion of inorganic fine particles such as colloidal silica in a resin; and sol-gel materials containing metal alkoxide such as tetraethoxysilane and titanium tetraethoxide. Preferably, the material contains a fluorine group in order to impart antifouling surface properties. In terms of, for example, scratch resistance, the material preferably contains a large amount of an inorganic component, and the sol-gel materials are more preferable. The sol-gel materials can be used after being condensed partially.

The antireflection layer (the low refractive index layer) may contain an inorganic sol in order to increase film strength. The inorganic sol is not particularly limited and examples thereof include inorganic sols of, for example, silica, alumina, and magnesium fluoride. Particularly, silica sol is preferred. The amount of the inorganic sol to be added is, for example, in the range of 10 to 80 parts by weight, per 100 parts by weight of the total solids of the material for forming an antireflection layer. The size of the inorganic fine particles in the inorganic sol is preferably in the range of 2 to 50 nm and more preferably in the range of 5 to 30 nm.

The material for forming the antireflection layer preferably contains hollow spherical silicon oxide ultrafine particles. The silicon oxide ultrafine particles have preferably an average particle size of about 5 to 300 nm and more preferably in the range of 10 to 200 nm. The silicon oxide ultrafine particles are, for example, in the form of hollow spheres each including a pore-containing outer shell in which a hollow is formed. The hollow contains at least one of a solvent and a gas that has been used for preparing the silicon oxide ultrafine particles. A precursor substance for forming the hollow of the silicon oxide ultrafine particle preferably remains in the hollow. The thickness of the outer shell is preferably in the range of about 1 to 50 nm and in the range of approximately $\frac{1}{50}$ to $\frac{1}{5}$ of the average particle size of the silicon oxide ultrafine particles. Preferably, the outer shell is formed of a plurality of coating layers. In the silicon oxide ultrafine particles, it is preferable that the pore be blocked and the hollow be sealed with the outer shell. This is because the antireflection layer maintains a porous structure or a hollow of the silicon oxide ultrafine particles and therefore can have a further reduced refractive index. The method of manufacturing such hollow spherical silicon oxide ultrafine particles is preferably, for example, a method of manufacturing silica fine particles disclosed in JP 2001-233611 A.

The temperature for drying and curing that is employed in forming the antireflection layer (the low-refractive-index layer) is not particularly limited and is, for example, in the range of 60 to 150° C. and preferably in the range of 70 to 130° C. The period of time for drying and curing is, for instance, in the range of 1 to 30 minutes and preferably in the range of 1 to 10 minutes in view of productivity. After drying and curing, the layer is further heat-treated, so that a hard-coated antiglare film of high hardness including an antireflection layer can be obtained. The temperature for the heat treatment is not particularly limited and is, for example, in the range of 40 to 130° C. and preferably in the range of 50 to 100° C. The period of time for the heat treatment is not particularly limited and is, for instance, 1 minute to 100 hours and more preferably at least 10 hours in terms of improving scratch resistance. The heat treatment can be performed by a method using, for example, a hot plate, an oven, or a belt furnace.

When the hard-coated antiglare film including the antireflection layer is attached to an image display, the antireflection layer may frequently serve as the outermost surface and thus is susceptible to stains from the external environment. Stains are more conspicuous on the antireflection layer than on, for instance, a simple transparent plate. In the antireflection layer, for example, deposition of stains such as fingerprints, thumbmarks, sweat, and hair dressing products may change the surface reflectance, or the deposition may seem to stand out whitely to make the displayed content unclear. Preferably, an antistain layer formed of, for example, a fluoro-silane compound or a fluoro-organic compound is stacked on the antireflection layer in order to prevent deposition of stains and improve the ease of elimination of the stains deposited.

With respect to the hard-coated antiglare film of the present invention, it is preferable that at least one of the transparent plastic film substrate and the hard-coating antiglare layer be subjected to a surface treatment. When the transparent plastic film substrate is subjected to the surface treatment, adhesion thereof to the hard-coating antiglare layer, the polarizer, or the polarizing plate further improves. When the hard-coating antiglare layer is subjected to the surface treatment, adhesion thereof to the antireflection layer, the polarizer, or the polarizing plate further improves. The surface treatment can be, for example, a low-pressure plasma treatment, an ultraviolet radiation treatment, a corona treatment, a flame treatment, or an acid or alkali treatment. When a triacetyl cellulose film is used for the transparent plastic film substrate, the surface treatment is preferably an alkali treatment. This alkali treatment can be carried out as follows. That is, after being brought into contact with an alkali solution, the surface of the triacetyl cellulose film is washed with water and is then dried. The alkali solution can be, for example, a potassium hydroxide solution or a sodium hydroxide solution. The normal concentration of the hydroxide ions of the alkali solution is preferably in the range of 0.1 to 3.0 N (mol/L) and more preferably in the range of 0.5 to 2.0 N (mol/L).

In a hard-coated antiglare film including the transparent plastic film substrate and the hard-coating antiglare layer formed on one surface of the transparent plastic film substrate, in order to prevent curling, the other surface may be subjected to a solvent treatment. The solvent treatment can be carried out by bringing the transparent plastic film substrate into contact with a dissolvable or swellable solvent. The solvent treatment also imparts a tendency to curl to the other surface. This can cancel a tendency to curl that is caused by formation of the hard-coating antiglare layer, and thus can prevent curling. Similarly, in the hard-coated antiglare film including the transparent plastic film substrate and the hard-coating antiglare layer formed on one surface of the transparent plastic film substrate, in order to prevent curling, a transparent resin layer may be formed on the other surface. The transparent resin layer can be, for example, a layer that is composed mainly of a thermoplastic resin, a radiation-curable resin, a thermo-setting resin, or any other reactive resin. Particularly, a layer composed mainly of a thermoplastic resin is preferred.

The transparent plastic film substrate side of the hard-coated antiglare film of the present invention is generally bonded to an optical component for use in a LCD with a pressure-sensitive adhesive or an adhesive. Before bonding, the transparent plastic film substrate surface may be subjected to various surface treatments as described above.

The optical component can be, for example, a polarizer or a polarizing plate. Generally, a polarizing plate has a structure including a polarizer and a transparent protective film formed on one or both surfaces of the polarizer. If the transparent protective films are formed on both surfaces of the polarizer, respectively, the front and rear transparent protective films may be formed of the same material or different materials. Polarizing plates are generally disposed on both sides of a liquid crystal cell. Furthermore, polarizing plates are disposed such that the absorption axes of two polarizing plates are substantially perpendicular to each other.

Next, an optical component including a hard-coated antiglare film of the present invention stacked therein is described using a polarizing plate as an example. The hard-coated antiglare film of the present invention and a polarizer or polarizing plate can be stacked together with an adhesive or a pressure-sensitive adhesive and thereby a polarizing plate having the function according to the present invention can be obtained.

The polarizer is not particularly limited and various types can be used. Examples of the polarizer include: a film that is uniaxially stretched after a hydrophilic polymer film, such as a polyvinyl alcohol type film, a partially formalized polyvinyl alcohol type film, or an ethylene-vinyl acetate copolymer type partially saponified film, is allowed to adsorb dichromatic substances such as iodine or a dichromatic dye; and a polyene type oriented film, such as a dehydrated polyvinyl alcohol film or a dehydrochlorinated polyvinyl chloride film. Particularly, a polarizer formed of a polyvinyl alcohol type film and a dichromatic material such as iodine is preferred because it has a high polarization dichroic ratio. The thickness of the polarizer is not particularly limited and is, for example, about 5 to 80 µm.

A polarizer that is uniaxially stretched after a polyvinyl alcohol type film is dyed with iodine can be produced as follows. For example, a polyvinyl alcohol type film is immersed in an aqueous solution of iodine to be dyed and is then stretched by 3 to 7 times the original length. The aqueous solution of iodine may contain, for example, boric acid, zinc sulfate, or zinc chloride, if necessary. Separately, the polyvinyl alcohol type film may be immersed in an aqueous solution containing, for example, boric acid, zinc sulfate, or zinc chloride. Furthermore, before dyeing, the polyvinyl alcohol type film may be immersed in water to be washed therein if needed. Washing the polyvinyl alcohol type film with water allows contaminants and antiblocking agents on the polyvinyl alcohol type film surface to be washed off and also provides an effect of preventing non-uniformity, such as unevenness in dyeing, from occurring by allowing the polyvinyl alcohol type film to swell. The polyvinyl alcohol type film may be stretched after being dyed with iodine, may be stretched while being dyed, or may be dyed with iodine after being stretched. Stretching can be carried out in an aqueous solution of, for example, boric acid or potassium iodide or in a water bath.

Preferably, the transparent protective film formed on one or both surfaces of the polarizer is excellent in, for example, transparency, mechanical strength, thermal stability, moisture-blocking properties, and retardation value stability. Examples of the material for forming the transparent protective film include the same materials as those used for the aforementioned transparent plastic film substrate.

Moreover, the polymer films described in JP 2001-343529 A (WO01/37007) also can be used as the transparent protective film. The polymer films described in JP 2001-343529 A are formed of, for example, resin compositions including (A) thermoplastic resins having at least one of a substituted imide group and a non-substituted imide group in the side chain thereof and (B) thermoplastic resins having at least one of a substituted phenyl group and a non-substituted phenyl group as well as a nitrile group in the side chain thereof. Examples of the polymer films formed of the resin compositions described above include one formed of a resin composition including an acrylonitrile-styrene copolymer and an alternating copolymer containing isobutylene and N-methyl maleimide. The polymer film can be produced by extruding the resin composition in the form of a film. The polymer film has a small retardation and a small photoelastic coefficient and thus can eliminate defects such as unevenness due to distortion when it is used for a protective film of, for example, a polarizing plate. The polymer film also has low moisture permeability and thus has high durability against moisture.

From the viewpoints of, for example, polarizing properties and durability, the transparent protective film is preferably a film made of cellulose resin such as triacetyl cellulose or a film made of norbornene resin. Examples of commercial products of the transparent protective film include FUJITAC (trade name) (manufactured by Fuji Photo Film Co., Ltd.), ZEONOA (trade name) (manufactured by Nippon Zeon Co., Ltd.), and ARTON (trade name) (manufactured by JSR Corporation).

The thickness of the transparent protective film is not particularly limited. It can be, for example, in the range of 1 to 500 μm from the viewpoints of strength, workability such as handling properties, and thin layer properties. In the above range, the transparent protective film can mechanically protect a polarizer and can prevent a polarizer from shrinking and retain stable optical properties even when exposed to high temperature and high humidity. The thickness of the transparent protective film is preferably in the range of 5 to 200 μm and more preferably 10 to 150 μm.

The structure of a polarizing plate with the hard-coated antiglare film stacked therein is not particularly limited. The polarizing plate may have, for example, a structure in which the transparent protective film, the polarizer, and the transparent protective film are stacked in this order on the hard-coated antiglare film, or a structure in which the polarizer and the transparent protective film are stacked in this order on the hard-coated antiglare film.

The image display of the present invention can have the same configuration as those of conventional image displays except for including a hard-coated antiglare film of the present invention. For example, LCD, can be manufactured by suitably assembling respective components such as a liquid crystal cell, optical components such as a polarizing plate, and, if necessary, a lighting system (for example, a backlight), and incorporating a driving circuit.

The liquid crystal display of the present invention is used for any suitable applications. Examples of the applications include office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

EXAMPLES

Next, examples of the present invention are described together with comparative examples. The present invention is not limited by the following examples or comparative examples. Various properties in the examples and comparative examples described below were evaluated or measured by the following methods.

<Haze Value>

A haze meter HM-150 (manufactured by Murakami Color Research Laboratory) was used to measure haze value according to JIS K 7136 (2000 version) (haze (cloudiness)).

<Arithmetic Average Surface Roughness Ra>

A glass sheet (with a thickness of 1.3 mm) manufactured by Matsunami Glass Ind., Ltd. was bonded to the surface of a hard-coated antiglare film on which no hard-coating antiglare layer had been formed, with a pressure-sensitive adhesive. Subsequently, the surface shape of the hard-coating antiglare layer was measured using a high-precision microfigure measuring instrument (SURFCORDER ET4000 (trade name), manufactured by Kosaka Laboratory Ltd.) and the arithmetic average surface roughness Ra was then determined. The high-precision microfigure measuring instrument automatically calculates the arithmetic average surface roughness Ra. The arithmetic average surface roughness Ra is indicated according to JIS B 0601 (1994 version).

<The Number of Convexities that Exceed Roughness Mean Line of Surface Roughness Profile>

Figure 14:
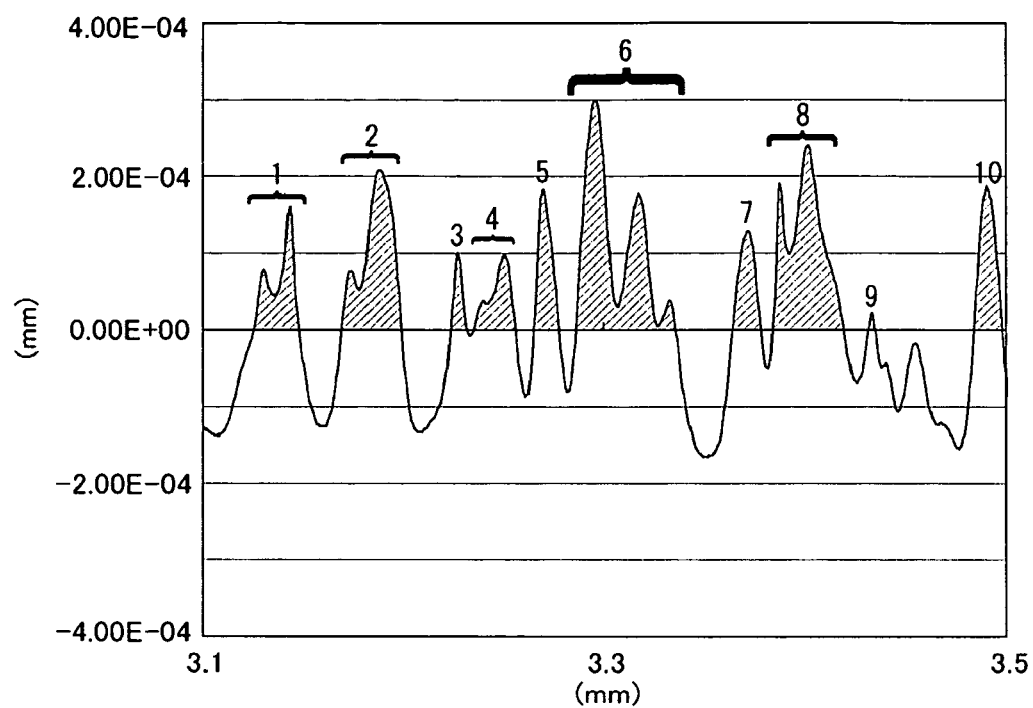
FIG. 14 is a schematic drawing for explaining a method of measuring the number of convexities that exceed the roughness mean line of the surface roughness profile in the present invention.

In the roughness profile obtained through the measurement of the surface shape, the number of convexities that exceed the roughness mean line of the profile on an arbitrary 4-mm straight line was counted and was then used as a measured value. FIG. 14 shows a schematic drawing for explaining the method of counting the number of the convexities. The convexities to be counted are hatched. The number of convexities to be counted was not the number of peaks but the number of portions that cross the mean line. For instance, when the profile includes a plurality of peaks in the range exceeding the mean line, such as those indicated with 1, 2, 4, 6, and 8, the number of convexities to be counted is one. In FIG. 14, the total number of the convexities is 10.

<The Number of Convexities that Exceed Standard Line of Surface Roughness>

Figure 15:
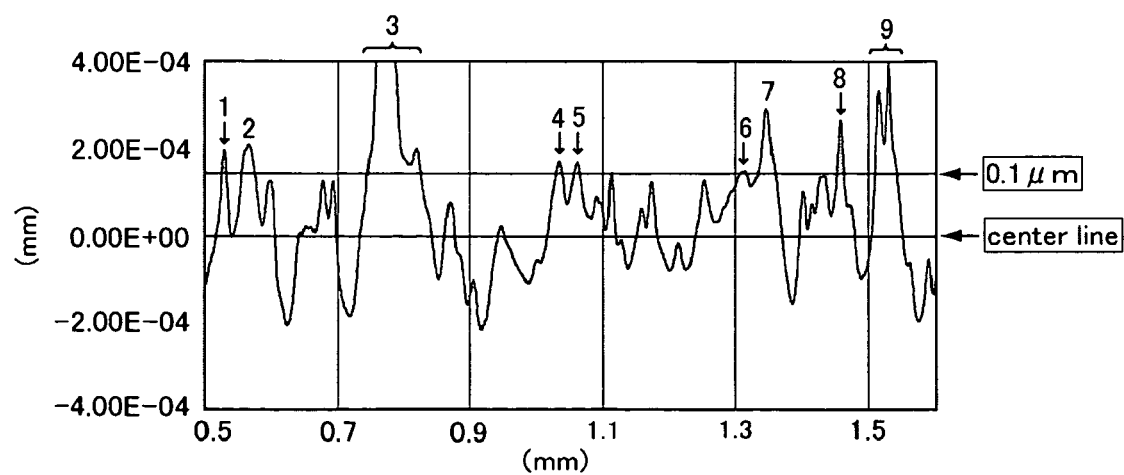
FIG. 15 is a schematic drawing for explaining a method of measuring the number of convexities that exceed the standard line of surface roughness in the present invention.
Figure 16:
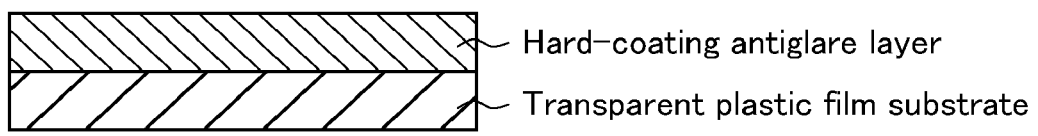
FIG. 16 is an example of a hard-coating antiglare layer formed on one surface of the substrate.
Figure 17:
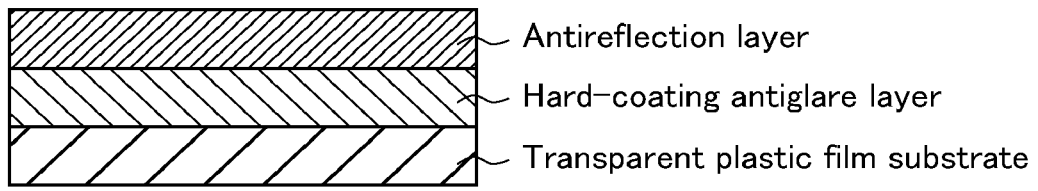
FIG. 17 is an example of an antireflection layer formed on an antiglare layer.
Figure 18:
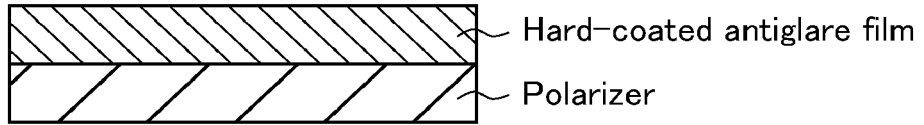
FIG. 18 is an example of a polarizing plate having a polarizer and a hard-coated antiglare film.

In the roughness profile obtained through the measurement of the surface shape, the line that was in parallel with the roughness mean line of the profile and was located at a height of 0.1 μm was taken as a standard line. With respect to the convexities that exceed the standard line on a 4-mm straight line in an arbitrary measurement region, the number of convexities in which line segments of the standard line that cross the convexities each have a length of 50 μm or longer as well as the number of convexities in which line segments of the standard line that cross the convexities each have a length of 20 μm or shorter were counted and were then used as measured values. FIG. 15 shows a schematic drawing for explaining the method of counting the number of the convexities. The number of convexities to be counted was not the number of peaks but the number of portions that cross the standard line. For instance, when the profile includes a plurality of peaks in the range exceeding the standard line, such as those indicated with 3 and 9, the number of convexities to be counted is one.

In FIG. 15, the number of convexities of 50 μm or longer is one, specifically the peak 3 in the profile, while the number of convexities of 20 μm or shorter is 5 in total, specifically peaks 1, 4, 5, 6, and 8 in the profile.

<Evaluation of Antiglare Properties>
(1) A black acrylic plate (with a thickness of 2.0 mm, manufactured by Mitsubishi Rayon Co., Ltd.) was bonded to the surface of a hard-coated antiglare film on which no hard-coating antiglare layer had been formed, with a pressure-sensitive adhesive. Thus, a sample was produced that had a back surface with no reflection.
(2) In an office environment (about 1000 Lx) where displays are used in general, the antiglare properties of the sample produced above were judged visually according to the following criteria:
AA: image reflection is observed but has a small effect on visibility,
A: image reflection is observed with no problem in practical use, and
B: image reflection is observed with a problem in practical use.

<Glare Evaluation>
The surface of a hard-coated antiglare film on which no hard-coating antiglare layer had been formed was bonded to a 1.3-mm thick glass sheet. Thus a measurement sample was obtained. This sample was set on a mask pattern placed above a backlight (manufactured by Hakuba Photo Industry Co., Ltd., "Light-Viewer 5700" (trade name)). The mask patterns used herein were a lattice-like pattern (140 ppi) having an opening with a size of 45 μm×119 μm, a vertical line width of 17 μm, and a horizontal line width of 63 μm, and a lattice-like pattern (212 ppi) having an opening with a size of 20 μm×58 μm, a vertical line width of 20 μm, and a horizontal line width of 62 μm. The distance from the mask pattern to the hard-coating antiglare layer was 1.3 mm, while the distance from the backlight to the mask pattern was 1.5 mm. Then glare of the hard-coated antiglare film was judged visually according to the following criteria:
AA: a level with glare but with a small effect on visibility,
A: a level with glare but with no problem in practical use, and
B: a level with considerable glare and problems in practical use.

<White Blur Evaluation>
(1) A black acrylic plate (with a thickness of 1.0 mm, manufactured by Nitto Jushi Kogyo Kabushiki Kaisha) was bonded to the surface of a hard-coated antiglare film on which no hard-coating antiglare layer had been formed, using a pressure-sensitive adhesive. Thus a sample was produced that had a back surface with no reflection.
(2) In an office environment (about 1000 Lx) where displays are used in general, the white blur phenomenon was observed visually by viewing the display from the direction that forms an angle of 60° with the reference (0°) that is the direction perpendicular to the plane of the sample thus produced. Then evaluation was made according to the following criteria:
AA: white blur is hardly observed,
A: white blur is observed but has a small effect on visibility, and
B: strong white blur is observed and deteriorates the visibility considerably.

<Refractive Indices of Transparent Plastic Film Substrate and Hard-Coating Layer>
The refractive indices of a transparent plastic film substrate and a hard-coating layer were measured with an Abbe refractometer (DR-M2/1550 (trade name)) manufactured by Atago Co., Ltd. by a measuring method specified for the apparatus. The measurement was carried out, with monobromonaphthalene being selected as an intermediate liquid, and with measuring light being allowed to be incident on the measuring planes of the film substrate and the hard-coating layer.

<Refractive Index of Fine Particles>
Fine particles were placed on a slide glass, and a refractive index standard solution was dropped onto the fine particles. Thereafter, a cover glass was placed thereon. Thus a sample was prepared. The sample was observed with a microscope and thereby the refractive index of the refractive index standard solution that was obtained at the point where the profiles of the fine particles were most difficult to view at the interface with the refractive index standard solution was used as the refractive index of the fine particles.

<Weight Average Particle Size of Fine Particles>
By the Coulter counting method, the weight average particle size of the fine particles was measured. Specifically, a particle size distribution measurement apparatus (Coulter Multisizer (trade name), manufactured by Beckman Coulter, Inc.) using a pore electrical resistance method was employed to measure electrical resistance of an electrolyte corresponding to the volume of the fine particles when the fine particles passed through the pores. Thus the number and volume of the fine particles were measured and then the weight average particle size thereof was calculated.

<Thickness of Hard-Coating Antiglare Layer>
A thickness gauge of a microgauge type manufactured by Mitutoyo Corporation was used to measure the total thickness of the hard-coated antiglare film. The thickness of the transparent plastic film substrate was subtracted from the total thickness. Thus the thickness of the hard-coating antiglare layer was calculated.

Example 1

A material for forming a hard-coating layer ("OPSTAR Z7540" (trade name), manufactured by JSR Corporation, solid content: 56% by weight, and solvent: butyl acetate/methyl ethyl ketone (MEK)=76/24 (weight ratio)) containing the component (A) was prepared in which silica nanoparticles (the aforementioned component (B)) formed by bonding inorganic oxide particles and an organic compound containing a polymerizable unsaturated group to each other were dispersed. The material for forming a hard-coating layer contained the components (A) and (B) in a weight ratio of the component (A) in total:component (B) of 2:3, where the component (A) was dipentaerythritol and isophorone diisocyanate polyurethane and the component (B) was silica fine particles (whose weight average particle size was 100 nm or smaller) whose surfaces had been modified with organic molecules. The cured film formed of the material for forming a hard-coating layer had a refractive index of 1.485. Five parts by weight of crosslinked acryl-styrene particles ("Techpolymer XX80AA", manufactured by Sekisui Plastics Co., Ltd., with a weight average particle size of 5.5 μm and a refractive index of 1.515) used as the fine particles, 0.1 part by weight of leveling agent ("GRANDIC PC-4100" (trade name), manufactured by Dainippon Ink and Chemicals, Incorporated), and 0.5 part by weight of photopolymerization initiator ("Irgacure 127" (trade name), manufactured by Ciba Specialty Chemicals) were mixed per 100 parts by weight of resin solid content of the material for forming a hard-coating layer. This mixture was diluted so as to have a solid concentration of 45% by weight and a butyl acetate/MEK weight ratio of 2/1. Thus a material for forming a hard-coating antiglare layer was prepared.

A triacetyl cellulose film ("TD80UL" (trade name), manufactured by Fuji Film Co., Ltd., with a thickness of 80 μm and a refractive index of 1.48) was prepared as a transparent plastic film substrate. The material for forming a hard-coating antiglare layer was applied to one surface of the transparent plastic film substrate with a comma coater. Thus, a coating film was formed. Subsequently, it was heated at 100° C. for one minute and thus the coating film was dried. Thereafter, it was irradiated with ultraviolet light at an accumulated light intensity of 300 mJ/cm$^2$ using a high pressure mercury lamp and thereby the coating film was cured to form a 9-μm thick hard-coating antiglare layer. Thus a hard-coated antiglare film of Example 1 was obtained.

Example 2

A hard-coated antiglare film of Example 2 was obtained in the same manner as in Example 1 except that the mixture was diluted so as to have a solid concentration of 45% by weight and a butyl acetate/MEK weight ratio of 3/1.

Example 3

A hard-coated antiglare film of Example 3 was obtained in the same manner as in Example 1 except that the fine particles used herein were crosslinked acryl-styrene particles, "Techpolymer XX79AA" (manufactured by Sekisui Plastics Co., Ltd., with a weight average particle size of 5.0 μm and a refractive index of 1.505).

Example 4

A hard-coated antiglare film of Example 4 was obtained in the same manner as in Example 1 except that a 11-μm thick hard-coating antiglare layer was formed using the material for forming a hard-coating antiglare layer of Example 1.

Example 5

A hard-coated antiglare film of Example 5 was obtained in the same manner as in Example 1 except that the fine particles used herein were crosslinked acryl-styrene particles, "Techpolymer XX79AA" (manufactured by Sekisui Plastics Co., Ltd., with a weight average particle size of 5.0 μm and a refractive index of 1.505), and the amount thereof to be added was 4 parts by weight per 100 parts by weight of resin solid content of the material for forming a hard-coating layer of Example 1.

Example 6

A hard-coated antiglare film of Example 6 was obtained in the same manner as in Example 1 except that the fine particles used herein were crosslinked acryl-styrene particles, "Techpolymer XX81AA" (manufactured by Sekisui Plastics Co., Ltd., with a weight average particle size of 5.0 μm and a refractive index of 1.535).

Example 7

A hard-coated antiglare film of Example 7 was obtained in the same manner as in Example 1 except that the fine particles used herein were crosslinked acryl-styrene particles, "Techpolymer XX94AA" (manufactured by Sekisui Plastics Co., Ltd., with a weight average particle size of 6.0 μm and a refractive index of 1.495).

Comparative Example 1

A hard-coated antiglare film of Comparative Example 1 was obtained in the same manner as in Example 1 except that a 15-μm thick hard-coating antiglare layer was formed using the material for forming a hard-coating antiglare layer of Example 1.

Comparative Example 2

A hard-coated antiglare film of Comparative Example 2 was obtained in the same manner as in Example 1 except that the mixture of Example 1 was diluted so as to have a solid concentration of 45% by weight and a butyl acetate/MEK weight ratio of 5/1.

Comparative Example 3

Resin ("GRANDIC PC 1097" (trade name), manufactured by Dainippon Ink and Chemicals, Incorporated, with a solid content of 66% by weight) containing the following components was prepared as the material for forming a hard-coating layer. The cured film formed of the material for forming a hard-coating layer had a refractive index of 1.53. Twenty parts by weight of acrylic particles ("SSX-108TNL" (trade name), manufactured by Sekisui Plastics Co., Ltd., with a weight average particle size of 8 μm and a refractive index of 1.495) and 0.1 part by weight of leveling agent ("GRANDIC PC-F479" (trade name), manufactured by Dainippon Ink and Chemicals, Incorporated) were mixed per 100 parts by weight of resin solid content of the material for forming a hard-coating layer. This mixture was diluted using ethyl acetate so as to have a solid concentration of 55% by weight. Thus a material for forming a hard-coating antiglare layer was prepared.

Isophorone diisocyanate urethane acrylate (100 parts by weight)

Dipentaerythritol hexaacrylate (38 parts by weight)

Pentaerythritol tetraacrylate (40 parts by weight)

Pentaerythritol triacrylate (15.5 parts by weight)

Polymer or copolymer having a repeating unit represented by the following general formula (1), or a mixture of the polymer and copolymer (30 parts by weight)

Photopolymerization initiator: 1.8 parts by weight of "Irgacure 184" (trade name, manufactured by Ciba Specialty Chemicals) and 5.6 parts by weight of Lucirin type photopolymerization initiator Mixed solvent: butyl acetate:ethyl acetate=3:4 (weight ratio)

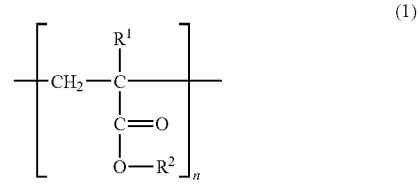

(1)

In formula (1), $R^1$ denotes —H or —CH$_3$, $R^2$ denotes —CH$_2$CH$_2$OX or a group that is represented by the following general formula (2), and X denotes —H or an acryloyl group that is represented by the following general formula (3).

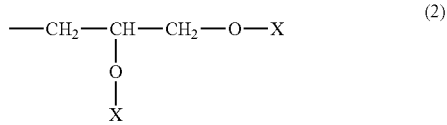

(2)

In general formula (2), X denotes —H or an acryloyl group that is represented by the following general formula (3), and the Xs may be identical to or different from each other.

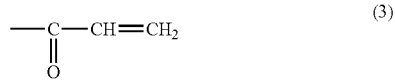

(3)

The material for forming a hard-coating antiglare layer was applied onto one surface of the transparent plastic film substrate with a comma coater. Thus a coating film was formed. Subsequently, it was heated at 100° C. for one minute and thus the coating film was dried. Thereafter, it was irradiated with ultraviolet light at an accumulated light intensity of 300 mJ/cm$^2$ using a high pressure mercury lamp and thereby the coating film was cured to form a 24-μm thick hard-coating antiglare layer. Thus a hard-coated antiglare film of Comparative Example 3 was obtained.

Comparative Example 4

An ultraviolet curable resin composed of isocyanurate triacrylate, pentaerythritol triacrylate, dipentaerythritol hexaacrylate, and isophorone diisocyanate polyurethane was prepared as the material for forming a hard-coating layer. The cured film of the material for forming a hard-coating layer had a refractive index of 1.53. 0.5 part by weight of leveling agent (DEFENSA MCF323 (trade name), manufactured by Dainippon Ink and Chemicals, Incorporated), 14 parts by weight of polystyrene particles ("Chemisnow SX350H" (trade name), manufactured by Soken chemical & Engineering Co., Ltd., with a weight average particle size of 3.5 μm and a refractive index of 1.59), and 5 parts by weight of photopolymerization initiator ("Irgacure 184" (trade name), manufactured by Ciba Specialty Chemicals), per 100 parts by weight of resin solid content of the material for forming a hard-coating layer were dissolved or dispersed in a mixed solvent (toluene:butyl acetate:ethyl acetate=86.5:1.0:12.5 (weight ratio)) so that the solid concentration was 45% by weight. Thus a material for forming a hard-coating antiglare layer was prepared.

The material for forming a hard-coating antiglare layer was applied onto one surface of the transparent plastic film substrate with a comma coater. Thus a coating film was formed. Subsequently, it was heated at 100° C. for one minute and thus the coating film was dried. Thereafter, it was irradiated with ultraviolet light at an accumulated light intensity of 300 mJ/cm$^2$ using a metal halide lamp and thereby the coating film was cured to form a 5-μm thick hard-coating antiglare layer. Thus a hard-coated antiglare film of Comparative Example 4 was obtained.

Comparative Example 5

A hard-coated antiglare film of Comparative Example 5 was obtained in the same manner as in Comparative Example 4 except that the crosslinked acryl-styrene particles used herein were "Techpolymer XX94AA" (manufactured by Sekisui Plastics Co., Ltd., with a weight average particle size of 6.0 μm and a refractive index of 1.495), the amount thereof to be added was 10 parts by weight per 100 parts by weight of resin solid content of the material for forming a hard-coating layer of Comparative Example 4, and a 10-μm thick hard-coating antiglare layer was formed.

Comparative Example 6

An ultraviolet curable resin composed of isocyanurate triacrylate, pentaerythritol triacrylate, dipentaerythritol hexaacrylate, and isophorone diisocyanate polyurethane was prepared as the material for forming a hard-coating layer. The cured film of the material for forming a hard-coating layer had a refractive index of 1.53. 0.5 parts by weight of leveling agent (Megaface F-470N (trade name), manufactured by Dainippon Ink and Chemicals, Incorporated), 8 parts by weight of amorphous silica particles ("Sylophobic 702" (trade name), manufactured by Fuji Silysia Chemical Ltd., with a weight average particle size of 2.5 μm and a refractive index of 1.46), and 5 parts by weight of photopolymerization initiator ("Irgacure 184" (trade name), manufactured by Ciba Specialty Chemicals) per 100 parts by weight of resin solid content of the material for forming a hard-coating layer were dissolved or dispersed in a mixed solvent (toluene:butyl acetate=85:15 (weight ratio)) so that the solid concentration was 38% by weight. Thus a material for forming a hard-coating antiglare layer was prepared.

The material for forming a hard-coating antiglare layer was applied onto one surface of the transparent plastic film substrate with a comma coater. Thus a coating film was formed. Subsequently, it was heated at 100° C. for one minute and thus the coating film was dried. Thereafter, it was irradiated with ultraviolet light at an accumulated light intensity of 300 mJ/cm$^2$ using a metal halide lamp and thereby the coating film was cured to form a 5-μm thick hard-coating antiglare layer. Thus a hard-coated antiglare film of Comparative Example 6 was obtained.

With respect to each hard-coated antiglare film of Examples 1 to 7 and Comparative Examples 1 to 6 thus obtained, various properties were measured or evaluated. The results are indicated in FIGS. 1 to 13 and Table 1 below.

TABLE 1

| | Thickness of HC film (μm) | Particle Size (μm) | The Number of Parts | Difference in Refractive Index | Haze (%) | Ra (μm) | The Number of Convexities | The Number of Convexity Cross Sections | | Antiglare Properties | Glare | | White Blur |
|---|---|---|---|---|---|---|---|---|---|---|---|---|---|
| | | | | | | | | 20 μm or less | 50 μm or more | | 140 ppi | 212 ppi | |
| Example 1 | 9 | 5.5 | 5 | 0.03 | 12 | 0.10 | 103 | 80 | 0 | AA | AA | AA | AA |
| Example 2 | 9 | 5.5 | 5 | 0.03 | 11 | 0.10 | 101 | 60 | 0 | AA | AA | AA | AA |

TABLE 1-continued

| | Thickness of HC film (μm) | Particle Size (μm) | The Number of Parts | Difference in Refractive Index | Haze (%) | Ra (μm) | The Number of Convexities | The Number of Convexity Cross Sections 20 μm or less | The Number of Convexity Cross Sections 50 μm or more | Antiglare Properties | Glare 140 ppi | Glare 212 ppi | White Blur |
|---|---|---|---|---|---|---|---|---|---|---|---|---|---|
| Example 3 | 9 | 5.0 | 5 | 0.02 | 8 | 0.08 | 93 | 52 | 0 | A | AA | A | A |
| Example 4 | 11 | 5.5 | 5 | 0.03 | 10 | 0.10 | 109 | 75 | 0 | AA | AA | A | A |
| Example 5 | 9 | 5.0 | 4 | 0.02 | 4 | 0.09 | 112 | 87 | 0 | A | AA | A | AA |
| Example 6 | 9 | 5.0 | 5 | 0.05 | 25 | 0.12 | 105 | 64 | 0 | AA | AA | A | A |
| Example 7 | 9 | 6.0 | 5 | 0.01 | 2 | 0.11 | 10 | 69 | 1 | AA | A | B | AA |
| Comparative Example 1 | 15 | 5.5 | 5 | 0.03 | 10 | 0.07 | 55 | 20 | 1 | B | B | B | AA |
| Comparative Example 2 | 9 | 5.5 | 5 | 0.03 | 10 | 0.09 | 79 | 46 | 0 | B | B | B | AA |
| Comparative Example 3 | 24 | 8.0 | 20 | 0.04 | 18 | 0.10 | 59 | 23 | 4 | AA | B | B | AA |
| Comparative Example 4 | 5 | 3.5 | 14 | 0.06 | 43 | 0.17 | 86 | 83 | 1 | AA | AA | AA | B |
| Comparative Example 5 | 10 | 6.0 | 10 | 0.04 | 10 | 0.18 | 90 | 54 | 3 | AA | B | B | B |
| Comparative Example 6 | 5 | 2.5 | 8 | 0.06 | 20 | 0.22 | 104 | 91 | 0 | AA | B | B | B |

As indicated in Table 1 above, good results were obtained with respect to all the items of antiglare properties, glare, and white blur in the examples. On the other hand, in the comparative examples, although good results were obtained with respect to part of the items of antiglare properties, glare, and white blur, none of the comparative examples had good results with respect to all the properties. That is, from Comparative Examples 1 to 3, it is proved that when the number of convexities that exceed the roughness mean line of the surface roughness profile is small, good results are not obtained with respect to the glare properties. Further, from Comparative Examples 4 to 6, it is proved when Ra exceeds 0.15, white blur is considerable and visibility is considerably decreased. In Comparative Examples 5 and 6, good results were not obtained also with respect to the glare properties. With respect to Comparative Example 4, although the glare is prevented because of the higher haze value, good results are not obtained with respect to contrast. With respect to Example 7, the hard-coated antiglare film has the lower haze value and includes convexities with a length of the line segment of 50 μm or longer. In Example 7, although there was no problem in the glare properties in the high-definition lattice-like pattern of 140 ppi, the glare properties was not sufficient in the further high-definition lattice-like pattern of 212 ppi. By measuring Ra and the number of convexities, which are defined in the present invention, it also is possible to understand the tendency of visibility including, for example, antiglare properties, glare, and white blur without performing visual evaluation.

FIGS. 1 to 13 show the profiles of the sectional surface shapes of the hard-coated antiglare films obtained in the aforementioned examples and comparative examples. As compared to the hard-coated antiglare films obtained in the comparative examples, each of the hard-coated antiglare films obtained in the examples is in a condition that the whole is not rough but fine concavities and convexities are present sparsely and further no local large convexities (with a length of the line segment of 50 μm or longer) exist. It can be understood that hard-coated antiglare films with surface unevenness shapes like those of the examples are within the range defined by the aforementioned Ra and the size and number of the convexities, and furthermore, satisfy the predetermined haze value and thereby can be used suitably as hard-coated antiglare films.

The hard-coated antiglare film of the present invention makes it possible to solve all the contradictory problems in improving contrast, ensuring antiglare properties, preventing white blur, and providing high definition. Accordingly, the hard-coated antiglare film of the present invention can be used suitably, for example, for optical elements such as polarizing plates as well as image displays such as liquid crystal panels and LCDs. It has no limitation in application and is applicable across a wide field. Furthermore, measurement of the Ra and number of convexities, which are defined in the present invention, also makes it possible to understand the tendency of visibility including, for example, antiglare properties, glare, and white blur without performing visual evaluation. Thus, they also are effective as indices for evaluating an antiglare film.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hard-coated antiglare film, comprising a transparent plastic film substrate and a hard-coating antiglare layer containing fine particles on at least one surface of the transparent plastic film substrate,
   wherein a thickness of said hard-coating antiglare layer is in the range of 8 to 12 μm,
   a surface of said hard-coating antiglare layer containing fine particles has an uneven shape and has an arithmetic average surface roughness Ra (μm) that is defined in JIS B 0601 (1994 version) in a range of 0.05 to 0.15 μm, and said hard-coated antiglare film includes at least 80 convexities that exceed a roughness mean line of a surface roughness profile in a 4-mm long portion at an arbitrary location of the surface of the hard-coating antiglare layer, and the hard-coated antiglare film includes convexities exceeding a standard line that is in parallel with the roughness mean line of the surface roughness profile and is located at a height of 0.1 µm and includes at least 50 of the convexities in which line segments of portions of the standard line that cross the convexities each have a length of 20 µm or shorter in the 4-mm long portion at an arbitrary location of the surface of the hard-coating antiglare layer but does not include any convexities in which the line segments each have a length of 50 µm or longer.

2. The hard-coated antiglare film according to claim 1, having a haze value in a range of 4 to 25%.

3. The hard-coated antiglare film according to claim 1, wherein the hard-coating antiglare layer is formed using the fine particles and a material for forming a hard-coating layer that contains the following components (A) and (B):

the component (A): a curable compound containing at least one of an acrylate group and a methacrylate group, and the component (B): particles that are formed by bonding inorganic oxide particles and an organic compound containing a polymerizable unsaturated group to each other.

4. The hard-coated antiglare film according to claim 3, wherein the component (B) has a weight average particle size of 200 nm or smaller.

5. The hard-coated antiglare film according to claim 3, wherein in the component (B), the inorganic oxide particles include particles of at least one type selected from the group consisting of silicon oxide, titanium oxide, aluminum oxide, zinc oxide, tin oxide, and zirconium oxide.

6. The hard-coated antiglare film according to claim 3, wherein the material for forming a hard-coating layer contains the component (B) in a range of 100 to 200 parts by weight per 100 parts by weight of the component (A).

7. The hard-coated antiglare film according to claim 1, wherein a difference in refractive index between the material for forming a hard-coating layer and the fine particles is in a range of 0.01 to 0.04, at least one type of spherical or amorphous fine particles whose weight average particle size is in a range of 0.5 to 8 µm are contained as the fine particles, and the fine particles are contained in a range of 3 to 10 parts by weight per 100 parts by weight of the material for forming a hard-coating layer.

8. The hard-coated antiglare film according to claim 1, wherein the hard-coating antiglare layer has a thickness in a range that is 1.2 to 3 times a weight average particle size of the fine particles.

9. The hard-coated antiglare film according to claim 1, wherein an antireflection layer is formed on the hard-coating antiglare layer.

10. A polarizing plate, comprising a polarizer and a hard-coated antiglare film, wherein the hard-coated antiglare film is a hard-coated antiglare film according to claim 1.

11. An image display, comprising a hard-coated antiglare film, wherein the hard-coated antiglare film is a hard-coated antiglare film according to claim 1.

12. An image display, comprising a polarizing plate, wherein the polarizing plate is a polarizing plate according to claim 10.

* * * * *